United States Patent
Asao

(10) Patent No.: US 7,624,390 B2
(45) Date of Patent: Nov. 24, 2009

(54) OPTIMIZING COMPILING OF OBJECT ORIENTED SOURCE CODE

(75) Inventor: Shinobu Asao, Sakai (JP)

(73) Assignee: Panasonic Corporation, Osaka (JP)

( * ) Notice: Subject to any disclaimer, the term of this patent is extended or adjusted under 35 U.S.C. 154(b) by 955 days.

(21) Appl. No.: 11/289,678

(22) Filed: Nov. 30, 2005

(65) Prior Publication Data
US 2006/0123198 A1    Jun. 8, 2006

(30) Foreign Application Priority Data
Dec. 6, 2004    (JP)    ............... 2004-352558

(51) Int. Cl.
*G06F 9/45*    (2006.01)
*G06F 9/44*    (2006.01)

(52) U.S. Cl. .............. 717/159; 717/154; 717/151; 717/140

(58) Field of Classification Search ............ None
See application file for complete search history.

(56) References Cited

U.S. PATENT DOCUMENTS 5,901,314 A    5/1999    Boehme et al.
6,760,905 B1    7/2004    Hostetter et al.
7,171,649 B1 *    1/2007    Lawrence ................ 717/116
2005/0097530 A1    5/2005    Asao et al.

FOREIGN PATENT DOCUMENTS

JP    06-266562    9/1994

\* cited by examiner

*Primary Examiner*—Lewis A Bullock, Jr.
*Assistant Examiner*—Mark A Gooray
(74) *Attorney, Agent, or Firm*—McDermott Will & Emery LLP

(57) ABSTRACT

A method address storage table information, a class information and a function reference information are extracted from an intermediate code and analyzed. When any method determined in execution is not overridden in one of classes by the other class, method address storage tables of the respective classes are deleted and a method address storage table that can be commonly used in the both classes is generated. Then, method address storage table pointers of the both classes are renewed to a leading address value of the generated method address storage table that can be commonly used in the both classes. As described, the method address storage tables redundantly generated in the different classes are deleted so that an object code size can be reduced.

25 Claims, 26 Drawing Sheets

F I G. 2
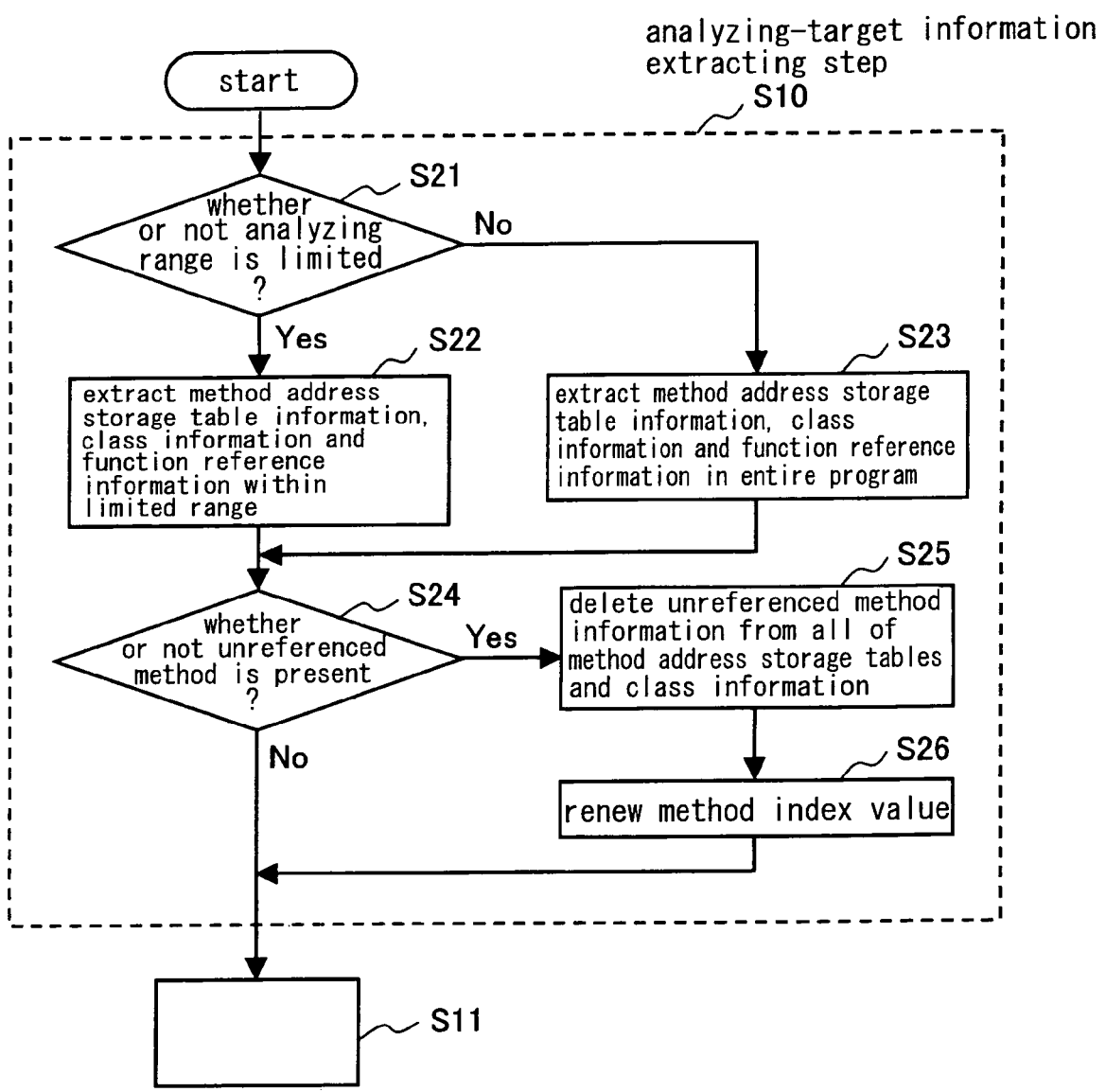

F I G. 3
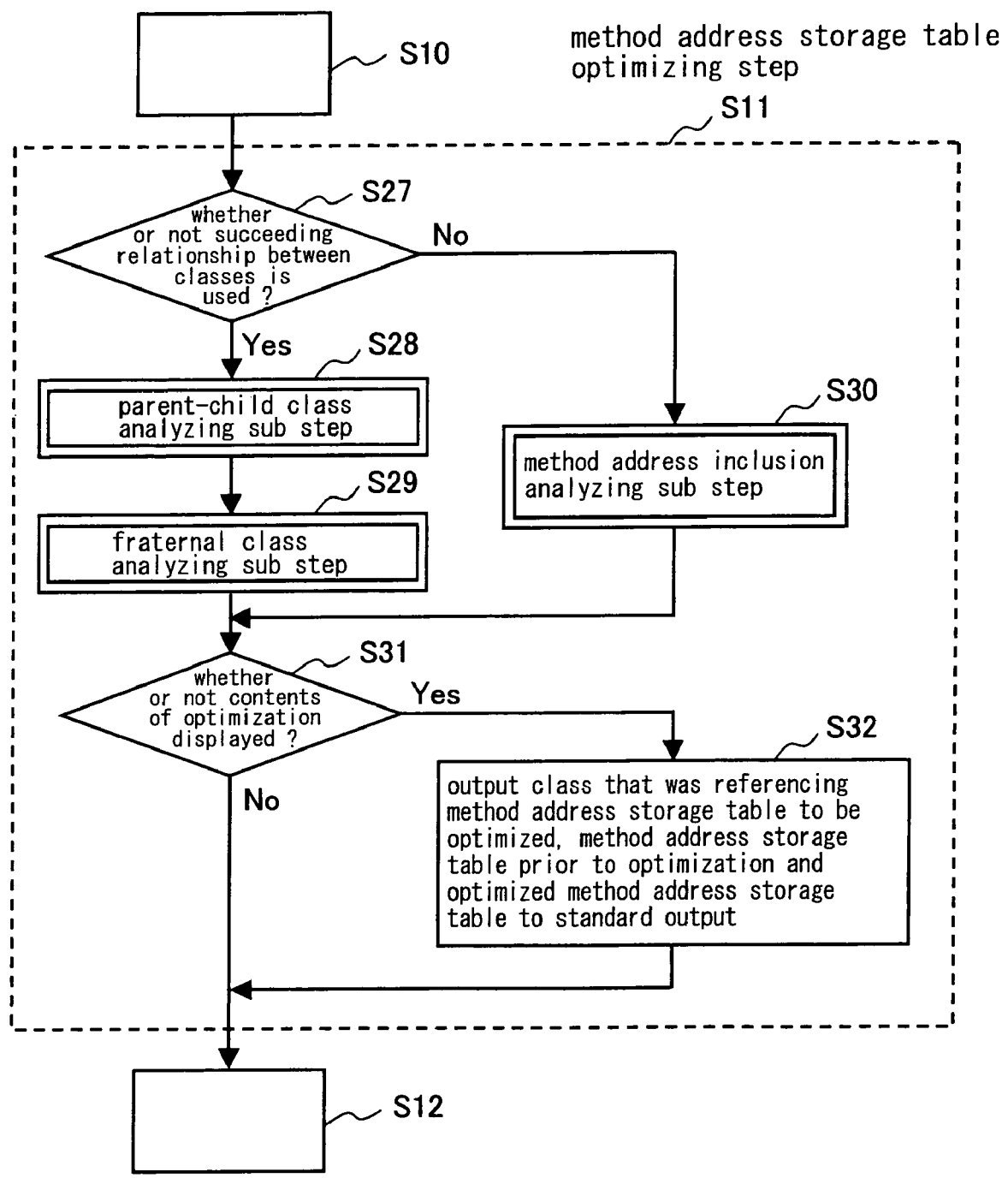

F I G. 4
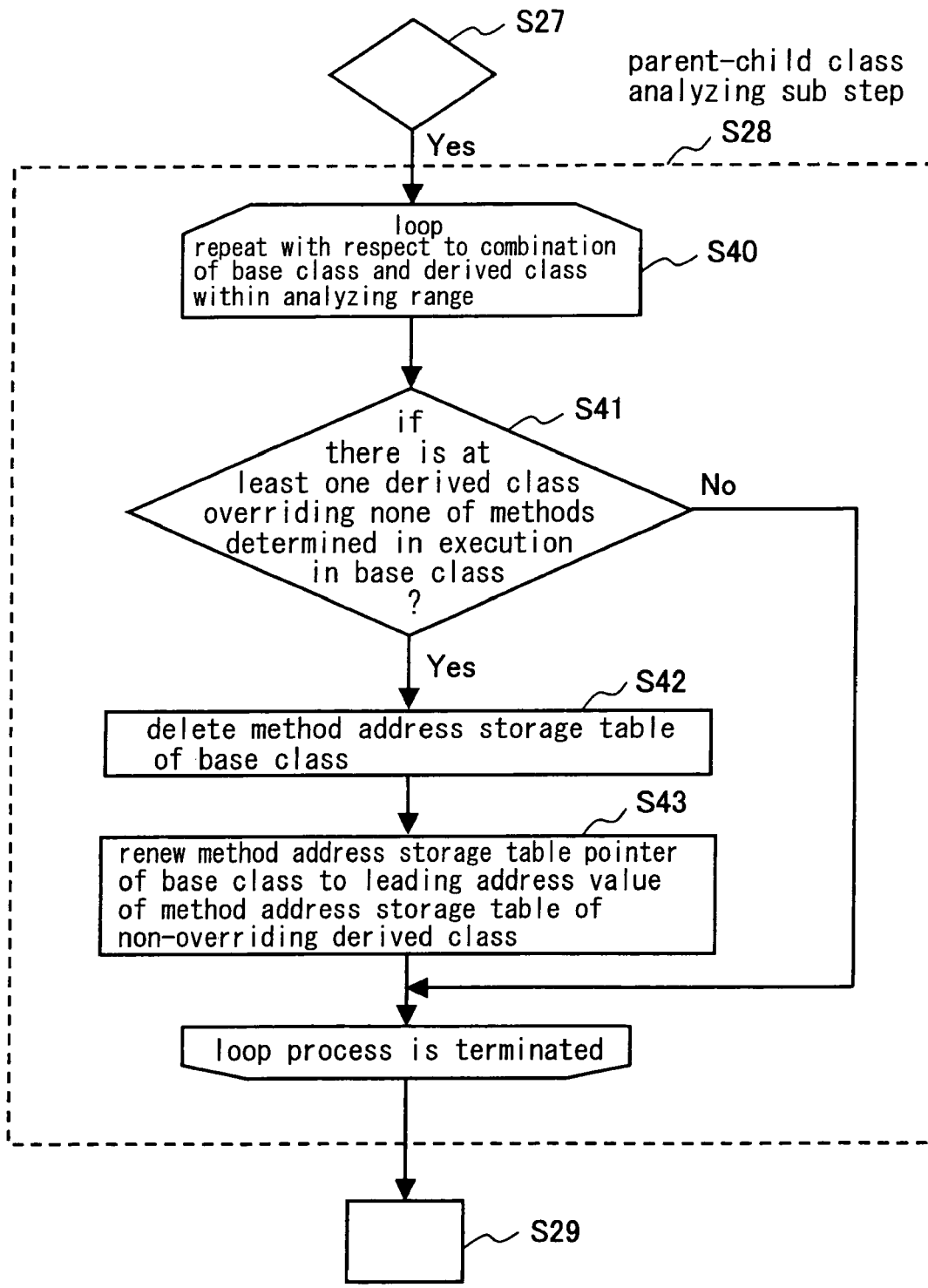

F I G. 8

```
<class.h> class A {
public:
    A() {...;}
    ~A() {...;}
    virtual int vfunc1() {...;} // define
    virtual int vfunc2() {...;} // define
};

class B : public A {
public:
    B() {...;}
    ~B() {...;}
    virtual int vfunc3() {...;} // define
};

class C : public B {
public:
    C() {...;}
    ~C() {...;}
};

class D : public B {
public:
    D() {...;}
    ~D() {...;}
    virtual int vfunc4() {...;} // define
};

class E : public B {
public:
    E() {...;}
    ~E() {...;}
    virtual int vfunc5() {...;} // define
};

class F : public A {
public:
    F() {...;}
    ~F() {...;}
    virtual int vfunc2() {...;} // override
};
```

```
<file1.cpp> include "class.h"

void f(A* p)
{
    ...
    p->vfunc1();
    ...
}

<file2.cpp> include "class.h"

void g(B* p)
{
    ...
    p->vfunc3();
    ...
} void h(B* p)
{
    ...
    p->vfunc4();
    ...
} void i(B* p)
{
    ...
    p->vfunc5();
    ...
} int main()
{
    ...
}
```

FIG. 10

```
information of class A
------------------------------------
base class                : none
derived class             : B,F
newly defined virtual function : vfunc1()
                          : vfunc2()
overriding                : none
```

```
function reference information
------------------------------------
vfunc1()  : referenced
vfunc2()  : unknown
vfunc3()  : unknown
vfunc4()  : unknown
vfunc5()  : unknown
```

```
information of class B
------------------------------------
base class                : A
derived class             : C,D,E
newly defined virtual function : vfunc3()
overriding                : none
```

```
information of class C
------------------------------------
base class                : B
derived class             : none
newly defined virtual function : none
overriding                : none
```

```
information of class D
------------------------------------
base class                : B
derived class             : none
newly defined virtual function : vfunc4()
overriding                : none
```

```
information of class E
------------------------------------
base class                : B
derived class             : none
newly defined virtual function : vfunc5()
overriding                : none
```

```
information of class F
------------------------------------
base class                : A
derived class             : none
newly defined virtual function : none
overriding                : vfunc2()
```

F I G. 1 2
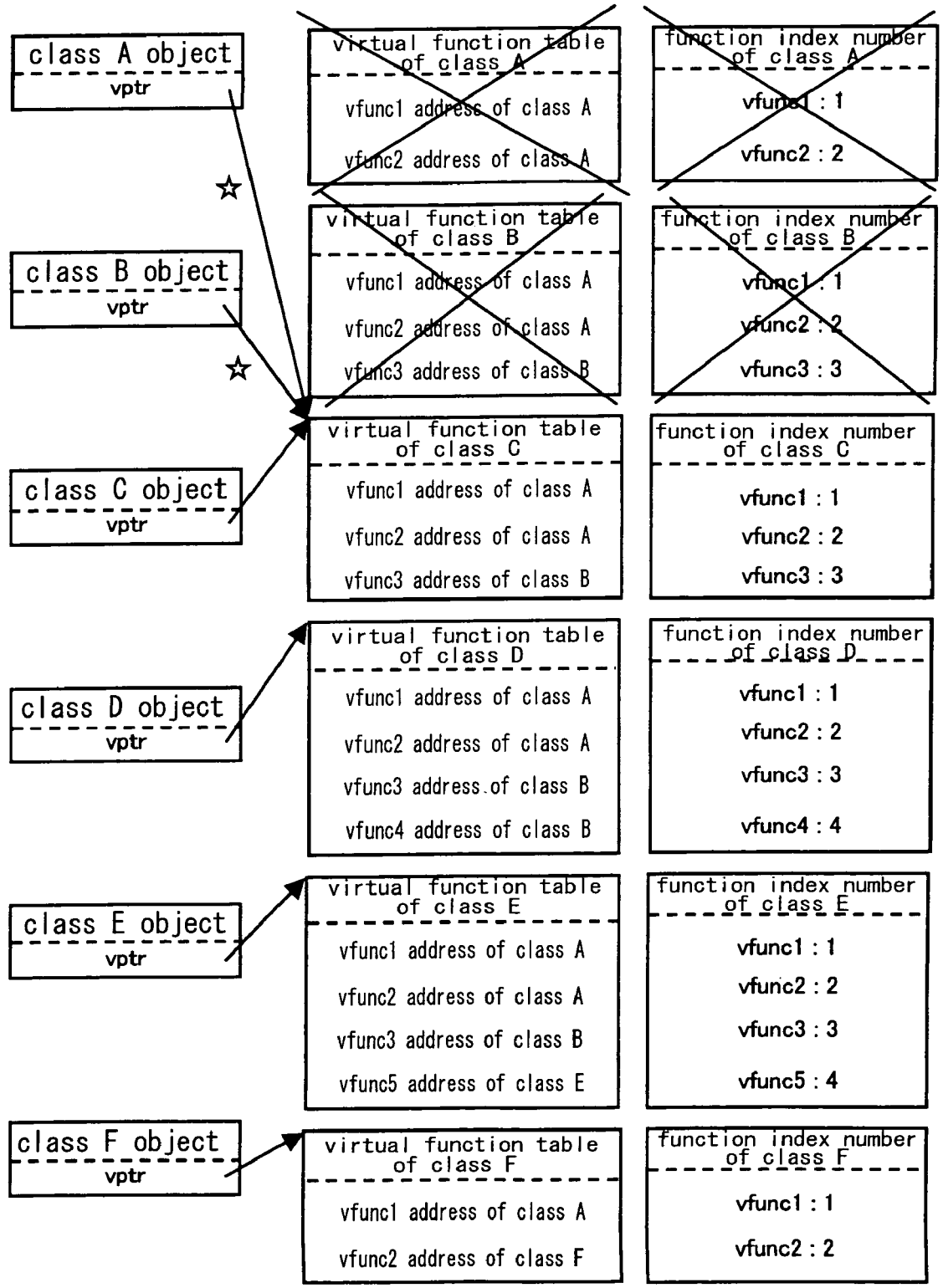

F I G. 1 4
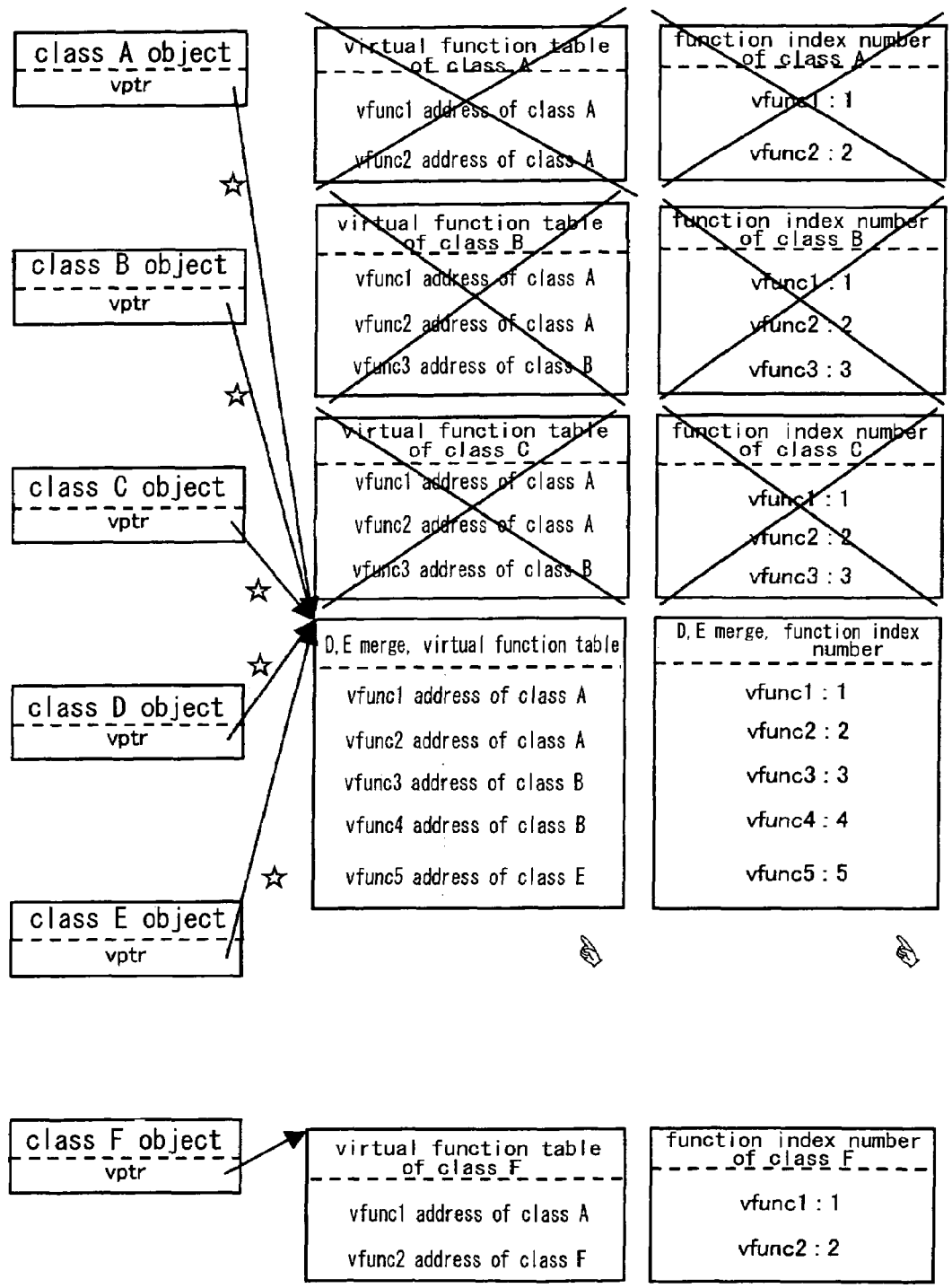

FIG. 15
Classes to be optimized : A, B, C, D, E
virtual function table prior to optimization :
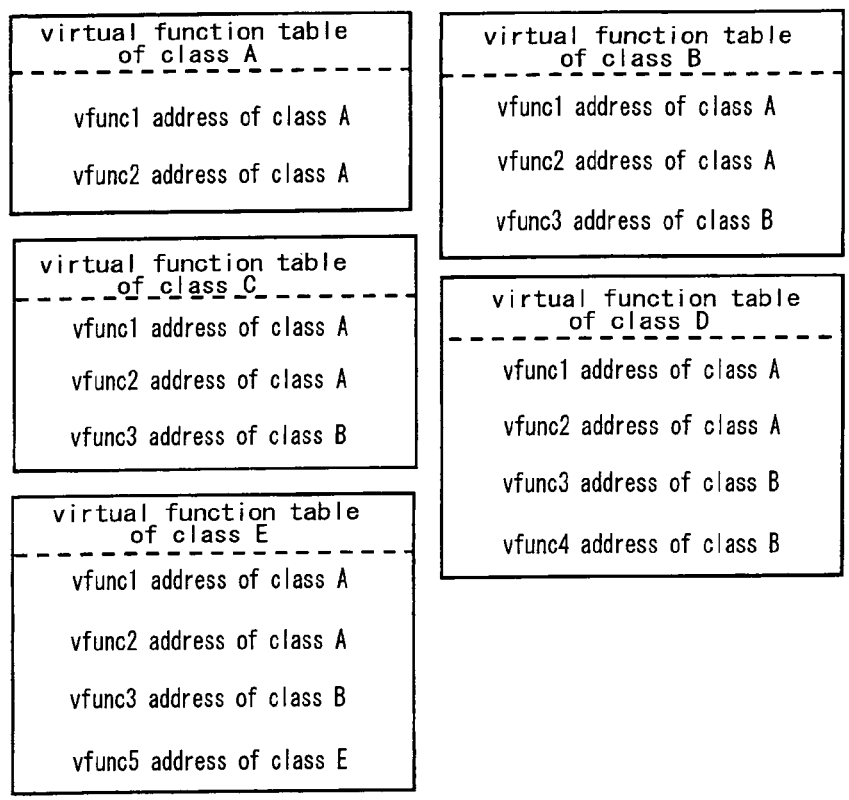
optimized virtual function table :
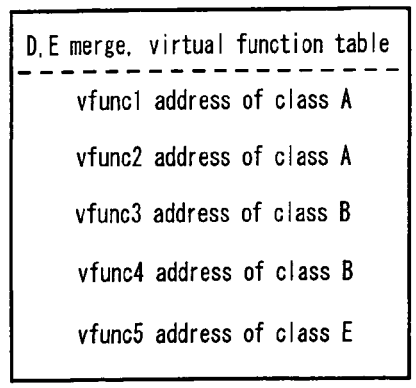

FIG. 16

```
__vt$1A      DD      _vfunc1__1A  ⎫ virtual function table
             DD      _vfunc2__1A  ⎭ of class A
             OBJECT  __vt$1A, 0x8
__vt$1B      DD      _vfunc1__1A  ⎫
             DD      _vfunc2__1A  ⎬ virtual function table
             DD      _vfunc3__1B  ⎭ of class B
             OBJECT  __vt$1B, 0xc
__vt$1C      DD      _vfunc1__1A  ⎫
             DD      _vfunc2__1A  ⎬ virtual function table
             DD      _vfunc3__1B  ⎭ of class C
             OBJECT  __vt$1C, 0xc
__vt$1D      DD      _vfunc1__1A  ⎫
             DD      _vfunc2__1A  ⎪ virtual function table
             DD      _vfunc3__1B  ⎬ of class D
             DD      _vfunc3__1D  ⎭
             OBJECT  __vt$1D, 0x10
__vt$1E      DD      _vfunc1__1A  ⎫
             DD      _vfunc2__1A  ⎪ virtual function table
             DD      _vfunc3__1B  ⎬ of class E
             DD      _vfunc5__1E  ⎭
             OBJECT  __vt$1E, 0x10
__vt$1F      DD      _vfunc1__1A  ⎫ virtual function table
             DD      _vfunc2__1F  ⎭ of class F
             OBJECT  __vt$1F, 0x8
``` total size of virtual function tables: 72 bytes 

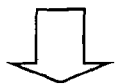

```
__vt$14_cm_1A1B1C1D1E   DD      _vfunc1__1A  ⎫
                        DD      _vfunc2__1A  ⎪ common virtual
                        DD      _vfunc3__1B  ⎬ function table
                        DD      _vfunc4__1B  ⎪ in A - E
                        DD      _vfunc5__1E  ⎭
                        OBJECT  __vt$14_cm_1A1B1C1D1E, 0x14
__vt$1F                 DD      _vfunc1__1A  ⎫ virtual
                        DD      _vfunc2__1F  ⎭ function table
                        OBJECT  __vt$1F, 0x8      of class F
``` total size of virtual function tables: 28 bytes 

→ reduced by 44 bytes 

FIG. 17

```
__vt$1A     DD       _vfunc1__1A  ⎫ virtual function table
            DD       _vfunc2__1A  ⎭ of class A
            OBJECT   __vt$1A, 0x8
__vt$1B     DD       _vfunc1__1A  ⎫
            DD       _vfunc2__1A  ⎬ virtual function table
            DD       _vfunc3__1B  ⎭ of class B
            OBJECT   __vt$1B, 0xc
__vt$1C     DD       _vfunc1__1A  ⎫
            DD       _vfunc2__1A  ⎬ virtual function table
            DD       _vfunc3__1B  ⎭ of class C
            OBJECT   __vt$1C, 0xc
__vt$1D     DD       _vfunc1__1A  ⎫
            DD       _vfunc2__1A  ⎪ virtual function table
            DD       _vfunc3__1B  ⎬ of class D
            DD       _vfunc3__1D  ⎭
            OBJECT   __vt$1D, 0x10
__vt$1E     DD       _vfunc1__1A  ⎫
            DD       _vfunc2__1A  ⎪ virtual function table
            DD       _vfunc3__1B  ⎬ of class E
            DD       _vfunc5__1E  ⎭
            OBJECT   __vt$1E, 0x10
__vt$1F     DD       _vfunc1__1A  ⎫ virtual function table
            DD       _vfunc2__1F  ⎭ of class F
            OBJECT   __vt$1F, 0x8
``` total size of virtual function tables: 72 bytes 

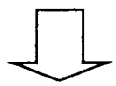

```
__vt$14_cm_1A1B1C1D  DD       _vfunc1__1A  ⎫
                     DD       _vfunc2__1A  ⎪ common virtual
                     DD       _vfunc3__1B  ⎬ function table
                     DD       _vfunc4__1B  ⎭ in A - D
                     OBJECT   __vt$12_cm_1A1B1C1D, 0x10
__vt$1E              DD       _vfunc1__1A  ⎫
                     DD       _vfunc2__1A  ⎪ virtual
                     DD       _vfunc3__1B  ⎬ function table
                     DD       _vfunc5__1E  ⎭ of class E
                     OBJECT   __vt$1E, 0x10
__vt$1F              DD       _vfunc1__1A  ⎫ virtual
                     DD       _vfunc2__1F  ⎭ function table
                                             of class F
                     OBJECT   __vt$1F, 0x8
``` total size of virtual function tables: 40 bytes 
→ reduced by 32 bytes

FIG. 18

| information of class A | |
|---|---|
| base class | : none |
| derived class | : B,F |
| newly defined virtual function | : vfunc1() |
| | : vfunc2() |
| overriding | : none |

| function reference information | |
|---|---|
| vfunc1() | : referenced |
| vfunc2() | : none |
| vfunc3() | : referenced |
| vfunc4() | : referenced |
| vfunc5() | : referenced |

| information of class B | |
|---|---|
| base class | : A |
| derived class | : C,D,E |
| newly defined virtual function | : vfunc3() |
| overriding | : none |

| information of class C | |
|---|---|
| base class | : B |
| derived class | : none |
| newly defined virtual function | : none |
| overriding | : none |

| information of class D | |
|---|---|
| base class | : B |
| derived class | : none |
| newly defined virtual function | : vfunc4() |
| overriding | : none |

| information of class E | |
|---|---|
| base class | : B |
| derived class | : none |
| newly defined virtual function | : vfunc5() |
| overriding | : none |

| information of class F | |
|---|---|
| base class | : A |
| derived class | : none |
| newly defined virtual function | : none |
| overriding | : vfunc2() |

F I G. 1 9

```
information of class A
base class                      : none
derived class                   : B,F
newly defined virtual function  : vfunc1()
overriding                      : none
```

```
information of class B
base class                      : A
derived class                   : C,D,E
newly defined virtual function  : vfunc3()
overriding                      : none
```

```
information of class C
base class                      : B
derived class                   : none
newly defined virtual function  : none
overriding                      : none
```

```
information of class D
base class                      : B
derived class                   : none
newly defined virtual function  : vfunc4()
overriding                      : none
```

```
information of class E
base class                      : B
derived class                   : none
newly defined virtual function  : vfunc5()
overriding                      : none
```

```
information of class F
base class                      : A
derived class                   : none
newly defined virtual function  : none
overriding                      : none
```

F I G. 2 0
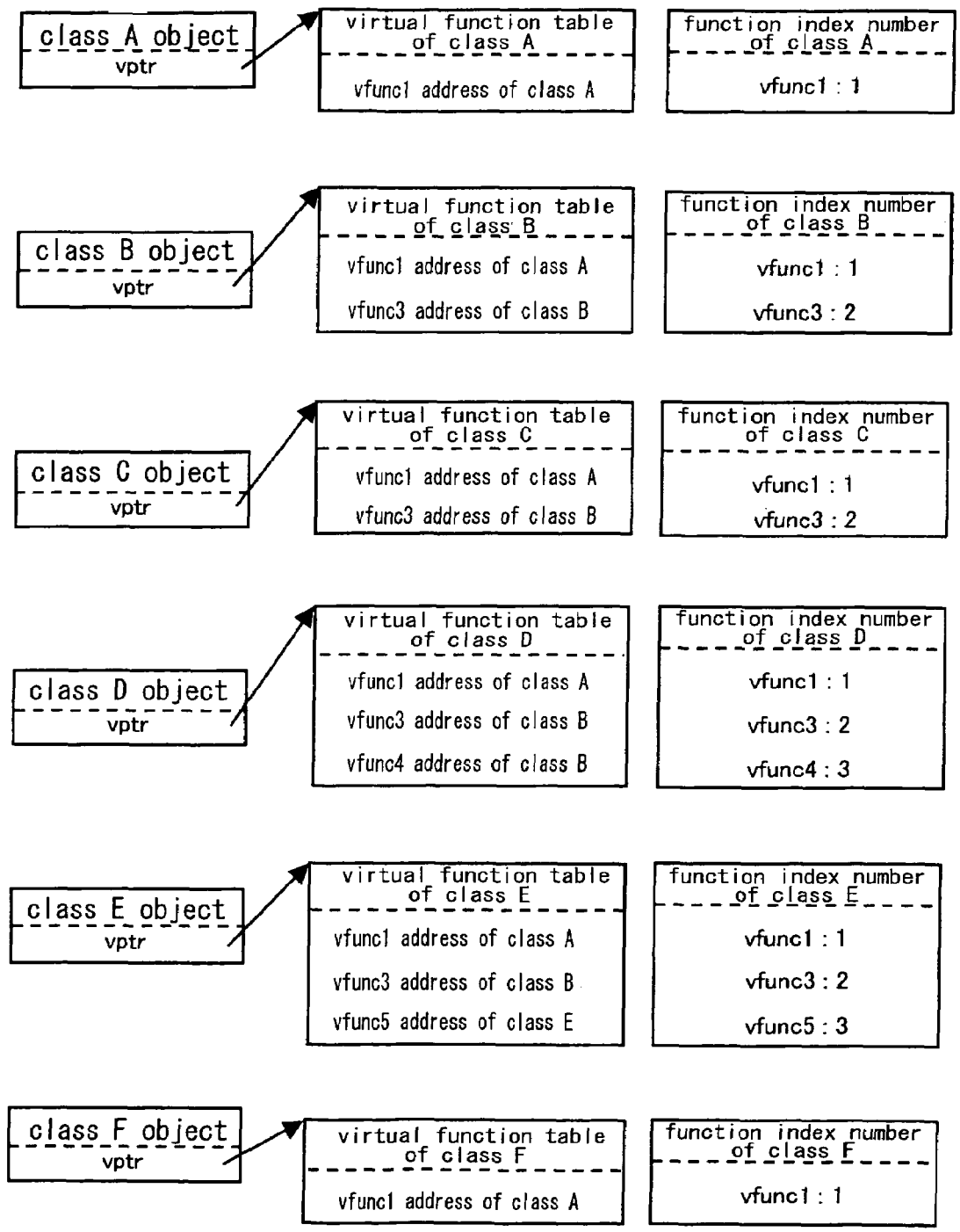

F I G. 2 2
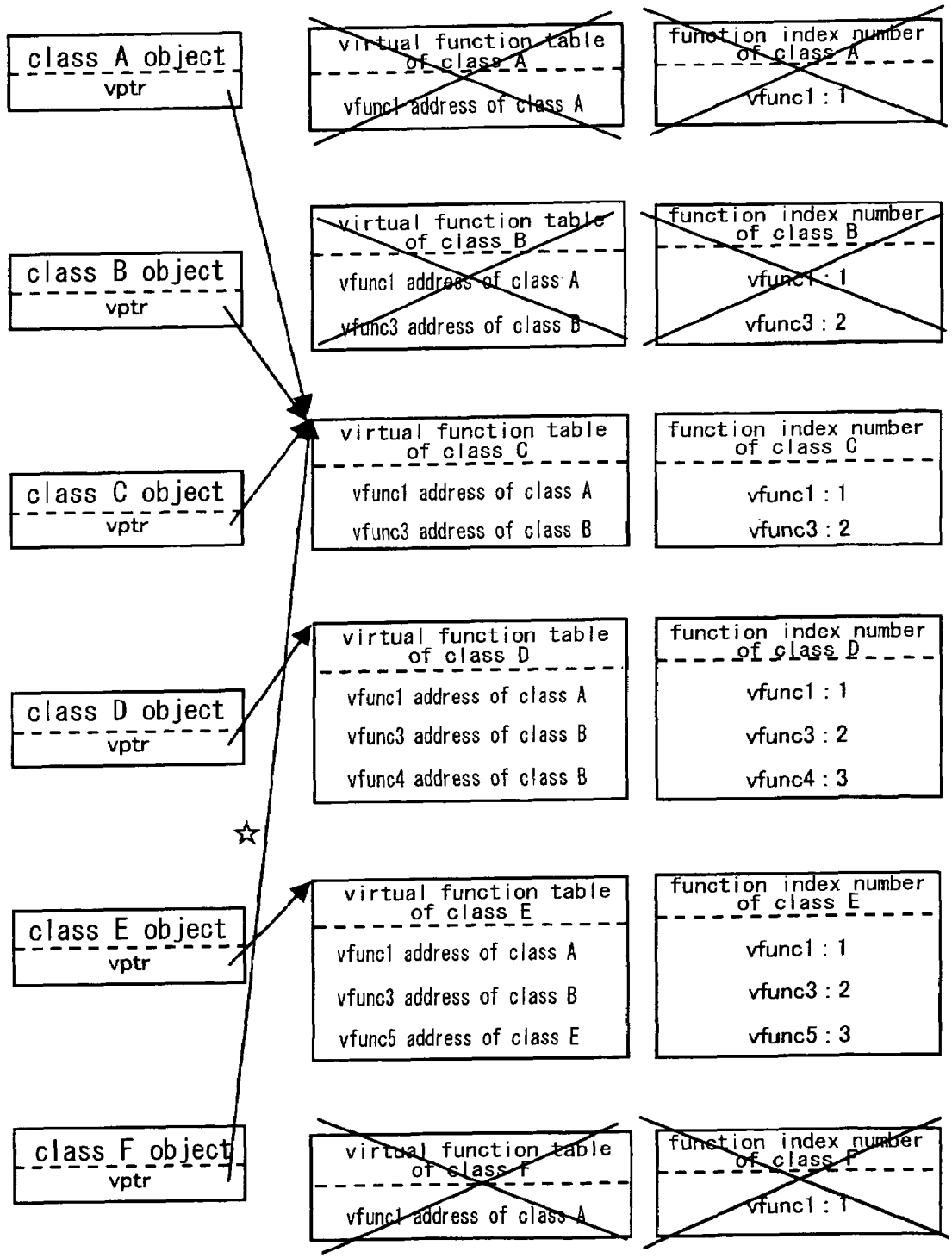

F I G. 2 4
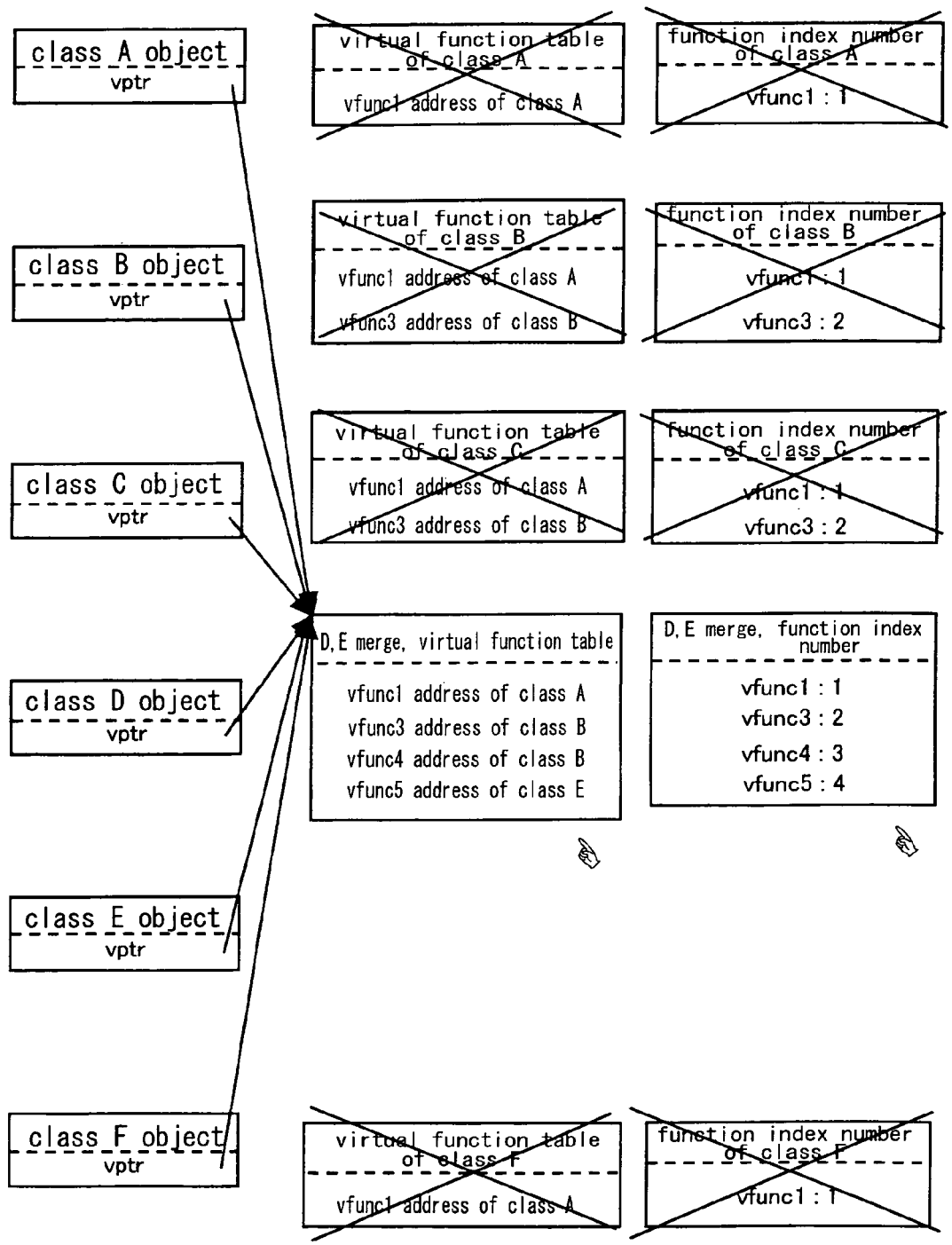

FIG. 25

```
__vt$1A      DD       _vfunc1__1A  ⎫ virtual function table
             DD       _vfunc2__1A  ⎭ of class A
             OBJECT   __vt$1A, 0x8
__vt$1B      DD       _vfunc1__1A  ⎫
             DD       _vfunc2__1A  ⎬ virtual function table
             DD       _vfunc3__1B  ⎭ of class B
             OBJECT   __vt$1B, 0xc
__vt$1C      DD       _vfunc1__1A  ⎫
             DD       _vfunc2__1A  ⎬ virtual function table
             DD       _vfunc3__1B  ⎭ of class C
             OBJECT   __vt$1C, 0xc
__vt$1D      DD       _vfunc1__1A  ⎫
             DD       _vfunc2__1A  ⎪
             DD       _vfunc3__1B  ⎬ virtual function table
             DD       _vfunc3__1D  ⎭ of class D
             OBJECT   __vt$1D, 0x10
__vt$1E      DD       _vfunc1__1A  ⎫
             DD       _vfunc2__1A  ⎪
             DD       _vfunc3__1B  ⎬ virtual function table
             DD       _vfunc5__1E  ⎭ of class E
             OBJECT   __vt$1E, 0x10
__vt$1F      DD       _vfunc1__1A  ⎫ virtual function table
             DD       _vfunc2__1F  ⎭ of class F
             OBJECT   __vt$1F, 0x8
``` total size of virtual function tables: 72 byte 

```
__vt$16_cm_1A1B1C1D1E1F  DD       _vfunc1__1A  ⎫
                         DD       _vfunc3__1B  ⎬ common virtual
                         DD       _vfunc4__1B  ⎪ function table
                         DD       _vfunc5__1E  ⎭ in A - F
                         OBJECT   __vt$16_cm_1A1B1C1D1E1F, 0x10
``` total size of virtual function tables: 16 bytes 
→ reduced by 56 bytes

OPTIMIZING COMPILING OF OBJECT ORIENTED SOURCE CODE

BACKGROUND OF THE INVENTION

1. Field of the Invention

The present invention relates to a compiling method, a compiling program, a compiling device and a compiling recording medium, more particularly to a technology for converting a source program described in an object-oriented language, a typical example of which is the C++ language, into an object code.

2. Description of the Related Art

A program size has been increasingly of a larger scale in the software development in recent years, in response to which an object-oriented language that can exert a high maintenance performance and can be effectively reutilized is attracting an attention. One of the features of the object-oriented language is to determine a method to be activated (code part in which a feature is described in the object-oriented language) in execution, which corresponds to a virtual function in the C++ language as a typical example of the object-oriented language.

In the case of mounting the feature of determining the method in the execution, in general, a method address storage table (table in which a leading address of each method is recorded) is statically generated in an outputted object code, and each class object references the method address storage table using a pointer for referencing the method address storage table corresponding to the relevant class (hereinafter, referred to as method address storage table pointer) and dynamically calls the methods determined in the execution using index values (hereinafter, referred to as index number) respectively determined for the methods so that the feature is realized.

Because the method address storage table is generated in the code as described, the outputted object code is enlarged as the table is increased in size. In order to control the increase of the outputted object code in size, the method address storage table must be generated in a non-redundant manner.

Describing a conventional compiling method, class name and input file name to which the respective methods determined in the execution belong are compared when the semantic analysis of a class declaration is executed. The entity and the declaration of the method address storage table are generated in the object code whey the class name and the input file name are coincident, while only the declaration of the method address storage table is generated in the object code when they fail to be coincident. The constitution of the conventional compiling method is recited in No. H06-266562 of the Publication of the Unexamined Japanese Patent Applications.

However, in the conventional compiling method, the redundant generation of the table is controlled through the comparison of the class name and the input file name, which can only contribute to the control of the redundant generation of the method address storage table with respect to the same classes in the respective input files, while failing to respond to redundant generation with respect to the different classes.

SUMMARY OF THE INVENTION

Therefore, a main object of the present invention is to provide a compiling method capable of efficiently generating a code by deleting any redundant output of a method address storage table in order to respond to different classes as well as same classes.

A compiling method according to the present invention for converting a source program described in an object-oriented language into an object code comprises: an intermediate code generating step for generating an intermediate code from the source program;

an analyzing-target information extracting step for extracting a method address storage table information, a class information and a function reference information from the intermediate code, wherein the method address storage table information includes at least a method address storage table, a method address storage table pointer for pointing to the method address storage table and a method index number corresponding to the method address storage table, the class information includes at least a base class name, a derived class name, a name of a new method determined in execution and an overridden method, and the function reference information is an information showing whether or not each method is referenced in the program;

a method address storage table optimizing step for optimizing the intermediate code by executing a process of analyzing the extracted analyzing-target information and deleting the method address storage table of each class when it is detected from the analysis that none of the methods determined in the execution is overridden in one of the classes by the other class, a process of generating the method address storage table commonly usable in the both classes and a process of renewing the method address storage table pointer of the both classes to a leading address value of the generated method address storage table commonly usable in the both classes; and an object code converting step for converting the optimized intermediate code into the object code.

According to the foregoing method, the common method address storage table is generated in place of the method address storage tables which are redundantly generated in the different classes, which improves the efficiency in generating the code.

As a preferred mode of the foregoing compiling method, the method address storage table information, the class information and the function reference information are extracted within a limited analyzing range when an analyzing-range limiting information including at least one of the file name, function name and class name is supplied to a compiler for executing the present compiling method in the analyzing-target information extracting step.

According to the method of the preferred mode, an analyzing time can be reduced because the analyzing range can be limited, which consequently reduces a compiling time.

As a more preferred mode of the foregoing method, when any method determined in the execution that is defined but not referenced yet is present, a process of deleting all of the methods determined in the execution that are defined but not referenced yet from the class information and the method address storage table and a process of renewing the index number of the method determined in the execution in the method address storage table after the implementation of the deleting process are executed in the analyzing-target information extracting step.

According to the method of the more preferred mode, the effect obtained by generating the common method address storage table is improved as a result of deleting any unreferenced method.

As another more preferred mode of the foregoing method, a process of deleting the method address storage table of the base class and a process of renewing the method address storage table pointer of the base class to a leading address value of the method address storage table of the derived class overriding none of the methods determined in the execution in the base classes are executed when there is at least one derived class overriding none of the methods determined in the execution in the base classes so that the intermediate code is optimized in the method address storage table optimizing step.

According to the method of the another more preferred mode, the method address storage table, which was redundantly generated between the classes in a succeeding relationship, can be commonly used. Thereby, the code can be more efficiently generated.

As still another preferred mode of the foregoing method, when at least two derived classes override none of the methods determined in the execution in the base classes and at least one of a pair of derived classes selected from the at least two derived classes does not newly define the method determined in the execution, a process of deleting the method address storage table of the derived class in which the method determined in the execution is not newly defined and a process of renewing the method address storage table pointer of the derived class from which the method address storage table is deleted to a leading address value of the method address storage table of the other derived class overriding none of the methods determined in the execution in the base classes are executed so that the intermediate code is optimized in the method address storage table optimizing step.

As still another preferred mode of the foregoing method, when at least two derived classes override none of the methods determined in the execution in the base classes, a pair of derived classes selected from the at least two derived classes both newly define the method determined in the execution, and at least one of the pair of derived classes further has a derived class, a process of newly generating the method address storage table by adding an address of the method determined in the execution newly defined in the one of the pair of derived classes to the method address storage table of the other of the pair of derived classes not further having a derived class and eliminating the former method address storage table, a process of renewing the method address storage table pointer of the pair of derived classes to a leading address value of the method address storage table newly generated, and a process of renewing the index value of the method determined in the execution in the method address storage table newly generated are executed so that the intermediate code is optimized in the method address storage table optimizing step.

According to the still another more preferred modes, the method address storage table, which was redundantly generated between the classes in a fraternal relationship, can be commonly used. Thereby, the code can be more efficiently generated.

As still another preferred mode of the foregoing method, when the method address storage tables of the respective classes are compared and a method address value stored in one of the method address storage tables is included in a leading position of the other method address storage table, a process of deleting the method address storage table whose method address value is included in the other, and a process of renewing the method address storage table pointer of the class pointing to the method address storage table whose address value is included in the other to a leading address value of the method address storage table that includes the method address value are executed so that the intermediate code is optimized in the method address storage table optimizing step.

According to the still another more preferred mode, the sharing of the method address storage tables can be accelerated without using the class information.

As still another preferred mode of the foregoing method, when an instruction for displaying details of the executed optimization is supplied to the compiler, the class referencing the method address storage table to be optimized, the method address storage table prior to the optimization and the optimized method address storage table are outputted to a standard output so that details of the optimized intermediate code are notified of a user in the method address storage table optimizing step.

According to the still another more preferred mode, the user can confirm the details of the optimization actually executed.

As still another preferred mode of the foregoing method, the object-oriented language is the C++ language, the method determined in the execution is a virtual function, the method address storage table is a virtual function table, and the method address storage table pointer is a virtual function table pointer.

According to the still another more preferred mode, an efficient code can be generated for the source program described in the C++ language.

The present invention can, not only realize the compiling method comprising the respective characteristic steps described so far, but also realize a compiling device comprising components capable of executing the characteristic steps included in the compiling method or realize a compiler for making a computer execute the characteristic steps included in the compiling method. Of course, the compiler can be distributed via transmission media, the complier can be recorded on a recording medium such as CD-ROM (Compact Disc-Read Only Memory), and also can be transmitted via internet and the like.

According to the compiling method recited in the invention, the redundant output of the method address storage table with respect to the different classes is deleted so that a downsized object code can be generated.

The compiling method according to the present invention can be applied to a compiling method and the like adopted in built-in devices demanding an object code having a downsized code size such as a mobile telephone and PDA (Personal Digital Assistant).

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 2 is a flow chart illustrating details of an analyzing-object information extracting step according to the embodiment.

FIG. 3 is a flow chart illustrating details of a method address storage table optimizing step according to the embodiment.

FIG. 4 is a flow chart illustrating details of a parent-child class analyzing sub step according to the embodiment.

FIG. 8 shows an example of a source program memorized in a program memorizing unit used in working examples 1, 2 and 3 according to the embodiment.

FIG. 10 shows an example of a class information in the working examples 1 and 2 according to the embodiment.

FIG. 12 shows an example of the virtual function table information after a second loop of the parent-child class analyzing sub step is executed in the working example 1 according to the embodiment and an example of the virtual function table information after a second loop of the method address inclusion analyzing sub step is executed in the working example 2 according to the embodiment.

FIG. 14 shows an example of the virtual function table after a second loop of the fraternal class analyzing sub step is executed in the working example 1 according to the embodiment.

FIG. 15 is an example of a shown result of an optimization information in the working example 1 according to the embodiment.

FIG. 16 shows an example of an assembler code generated from an intermediate code before optimization is executed and an example of the assembler code generated from the intermediate code after the optimization is executed in the working example 1 according to the embodiment.

FIG. 17 shows an example of the assembler code generated from the intermediate code before optimization is executed and an example of the assembler code generated from the intermediate code after the optimization is executed in the working example 2 according to the embodiment.

FIG. 18 shows an example of the class information in the working example 3 according to the embodiment.

FIG. 19 shows an example of the class information in the working example 3 according to the embodiment after an unreferenced virtual function is deleted.

FIG. 20 shows an example of a method address storage table information in the working example 3 according to the embodiment after the unreferenced virtual function is deleted.

FIG. 22 shows an example of the virtual function table information after a third loop of the parent-child class analyzing sub step is executed in the working example 3 according to the embodiment.

FIG. 24 shows an example of the virtual function table information after the second loop of the fraternal class analyzing sub step is executed in the working example 3 according to the embodiment.

FIG. 25 shows an example of the assembler code generated from the intermediate code before optimization is executed and an example of the assembler code generated from the intermediate code after the optimization is executed in the working example 3 according to the embodiment.

DETAILED DESCRIPTION OF THE INVENTION

Figure 1:
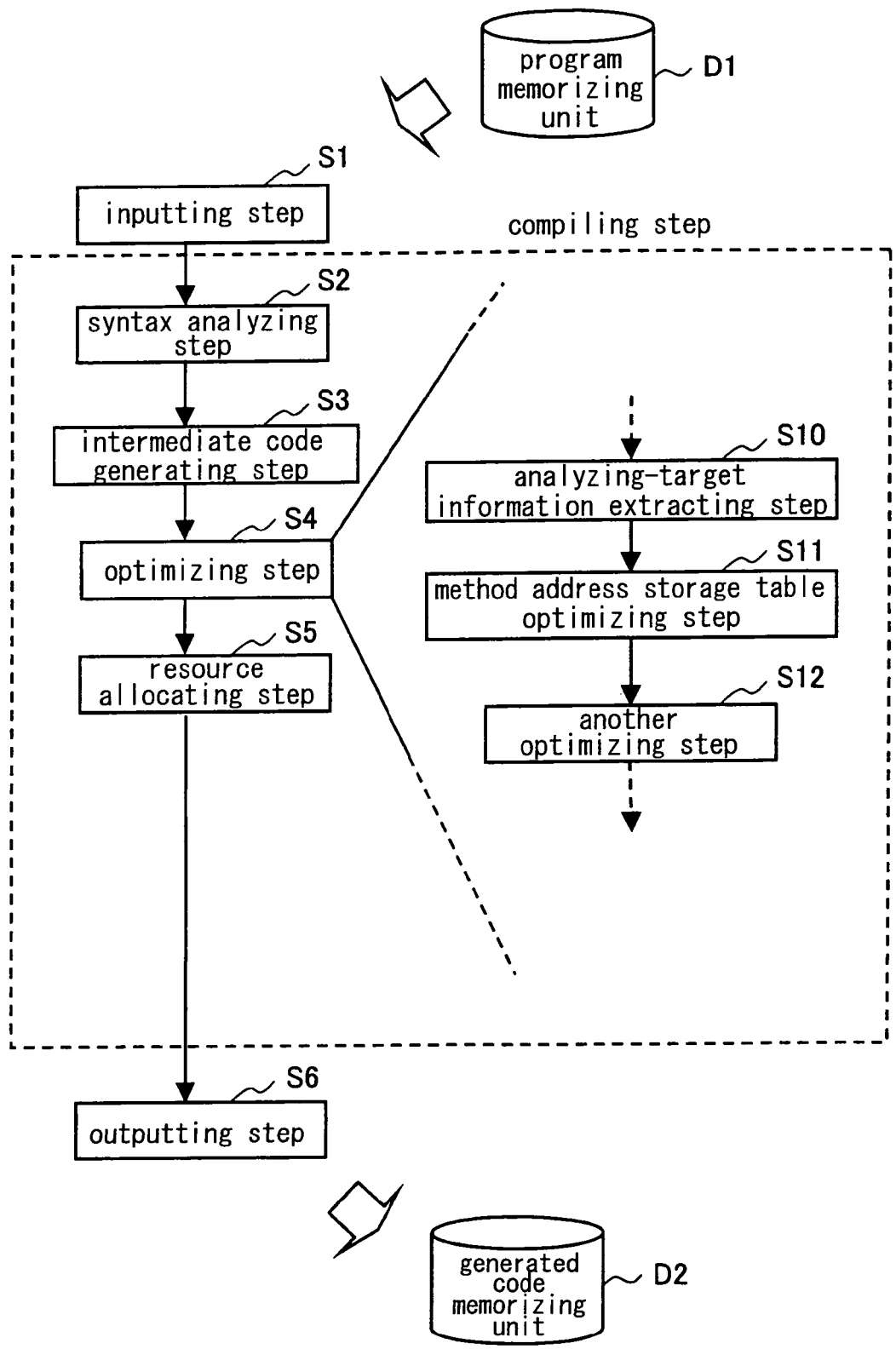
FIG. 1 is a flow chart of a process executed by a compiler according to an embodiment of the present invention.

Hereinafter, a compiler according to an embodiment of the present invention is described referring to the drawings.

FIG. 1 is a flow chat constituting the compiler (compiling device), wherein processes actually executed by the compiler are shown.

The flow chart may be written in a computer as a executable program, or may be recorded on a computer-readable recording medium such as CD-ROM (Compact Disc-Read Only Memory).

The compiler reads a header file and a source program recorded in a program memorizing unit D1 (S1). The compiler analyzes a syntax of the read source program to thereby generate a symbol table and a syntax tree (S2). Next, the compiler generates an intermediate code based on the generated syntax tree (S3). Then, the compiler executes various optimizing processes to the generated intermediate code (S4). Further, the compiler allocates hardware resources such as a register and a memory to all of variables included in the optimized intermediate code (S5), and converts the resource-allocated intermediate code into an object code and then outputs the object program to a generated code memorizing unit D2 (S6).

The optimizing step (S4) includes an analyzing-target information extracting step (S10), a method address storage table optimizing step (S11) and another optimizing step (S12).

In the analyzing-target information extracting step (S10), the intermediate code is analyzed, and a method address storage table information, a class information and a function reference information are extracted.

The method address storage table information includes at least a method address storage table, a method address storage table pointer for pointing to the method address storage table and a method index number corresponding to the method address storage table. The class information includes at least a base class name, a derived class name, a name of a new method determined in execution and an overridden method. The function reference information serves to show if each method is referenced in the program.

In the method address storage table optimizing step (S11), an analyzing-target information extracted in the analyzing-target information extracting step is analyzed. More specifically, the method address storage table of each class is deleted when it is learnt from the analysis of the extracted analyzing-target information that none of the methods determined in the execution in one of the classes is overridden (redefined) by the other class. Then, the method address storage table that can be commonly used by the both classes is generated, and the method address storage table pointers of the both classes are renewed to a leading address value of the generated method address storage table that can be commonly used by the both classes.

The analyzing-target information step (S10) and the method address storage table optimizing step (S11) will be described in detail later. The another optimizing step (S12) is an optimizing step, which is generally executed and does not constitute the gist of the present invention, is not described here.

The source program inputting step (S1), syntax analyzing step (S2), intermediate code generating step (S3), another optimizing step (S12), resource allocating step (S5) and object outputting step (S6), which are similar to conventionally employed processes and do not constitute the main object of the present invention, are not described in detail here.

Below are described the analyzing-object information extracting step (S10) and the method address storage table optimizing step (S11) constituting the main object of the present invention. FIG. 2 is a flow chart illustrating details of the analyzing-target information extracting step (S10).

The compiler judges whether or not an analyzing range in which the method address storage table is optimized is limited (S21). The analyzing range may be limited by means of a method of designating an option of a command line or by means of a method of designating a pragma described in the source program. The analyzing range described here may be a range corresponding to a translation unit (source program), a range corresponding to a function unit or a range corresponding to a class unit.

When it is judged that the analyzing range is limited (Yes in S21), the compiler extracts the method address storage table information, class information and function reference information of the limited range from the intermediate code (S22). The method address storage table information to be extracted includes the method determined in the execution and the method address storage table pointer. The method determined in the execution at least corresponds to an address stored in the table. The method address storage table pointer references the method index number and the table corresponding to each method.

The class information includes at least the base class name, derived class name, name of the new method determined in the execution and overridden method. The function reference information includes an information at least showing whether or not the defined method is referenced or whether or not the reference is unknown.

When it is judged that the analyzing range is not limited (No in S21), on the contrary, the compiler extracts all of the method address storage table informations, class informations and function reference informations from the intermediate code (S23).

Next, the compiler judges if there is any method determined in the execution not referenced though defined (S24). When it is judged that the unreferenced method determined in the execution is present (Yes in S24), the compiler deletes an address of the unreferenced method determined in the execution from all of the class informations and method address storage table informations extracted in the previous step (S22 or S23) (S25), and renews the method index value of the method address storage table after the deletion (S26). Next, the compiler executes the method address storage table optimizing step (S11).

FIG. 3 is a flow chart illustrating details of the method address storage table optimizing step (S11). The compiler judges whether or not a succeeding relationship between the classes is used for analyzing the optimization of the method address storage table (S27). Whether or not the succeeding relationship between the classes is used for the analysis may depend on the selection based on the user's designation (designation of the option or pragma) or may be dynamically determined by the compiler.

When it is judged that the succeeding relationship between the classes is used (Yes in S27), the compiler executes a parent-child class analyzing sub step (S28).

FIG. 4 is a flow chart illustrating details of the parent-child class analyzing sub step (S28). The compiler repeatedly executes a loop process (S40) with respect to combination of the base and derived classes within the analyzing range as follows. The compiler judges if there is at least one derived class overriding none of the method determined in the execution in the base class (S41).

In the presence of the at least one non-overriding derived class (Yes in S41), the method address storage table of the base class are deleted (S42), and all of the method address storage table pointers (including the method address storage table pointers of the base classes) that were referencing the deleted method address storage tables are renewed to the leading address value of the method address storage table of the non-overriding derived class (S43). Then, the loop process is again executed to the next combination of the base and derived classes (S40).

In the absence of the non-overriding derived class (No in S41), the loop process is executed to the next combination of the base and derived classes.

Next, the compiler executes a fraternal class analyzing sub step (S29).

Figure 5:
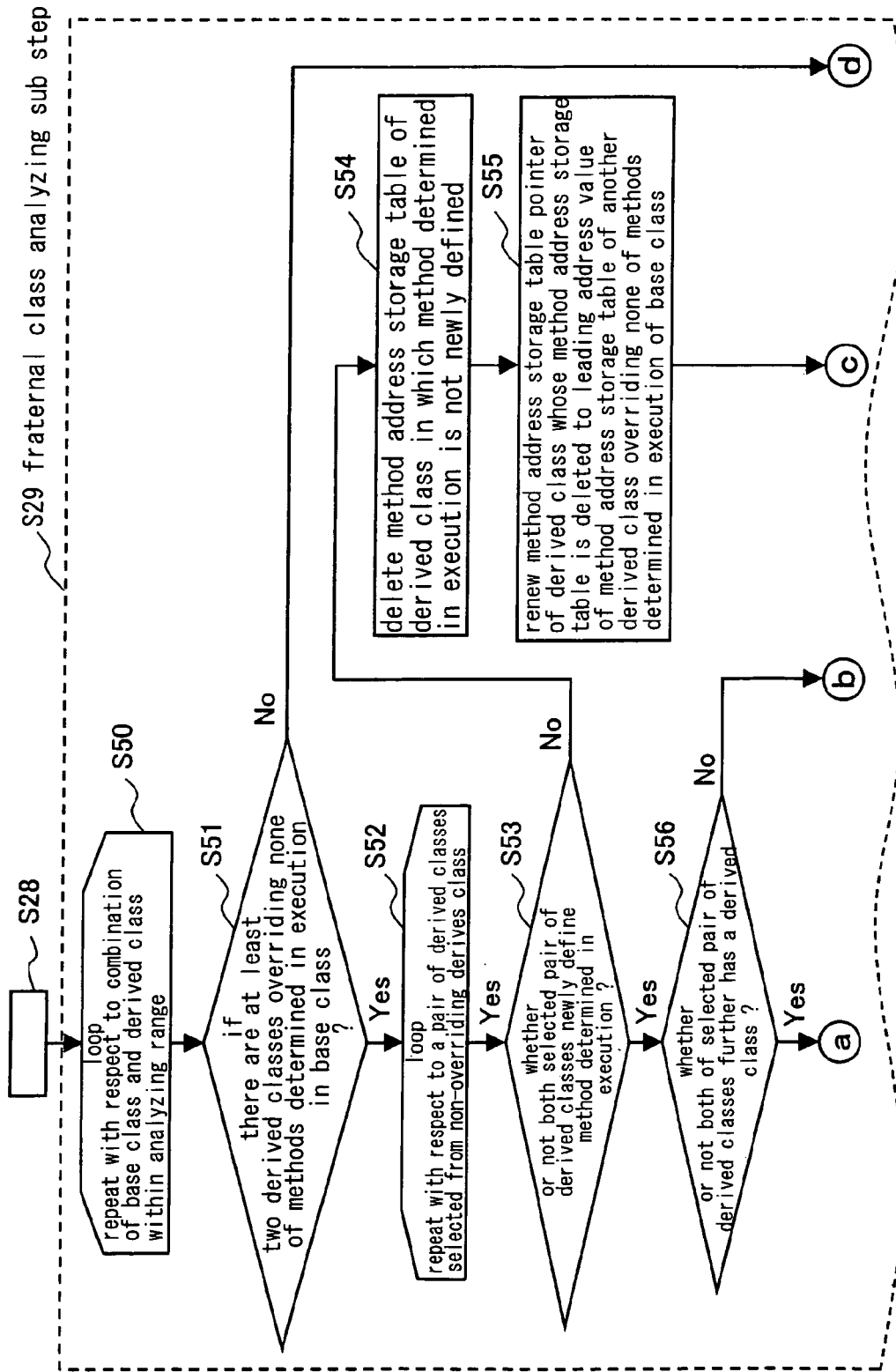
FIG. 5 is a (first) flow chart illustrating details of a fraternal class analyzing sub step according to the embodiment.
Figure 6:
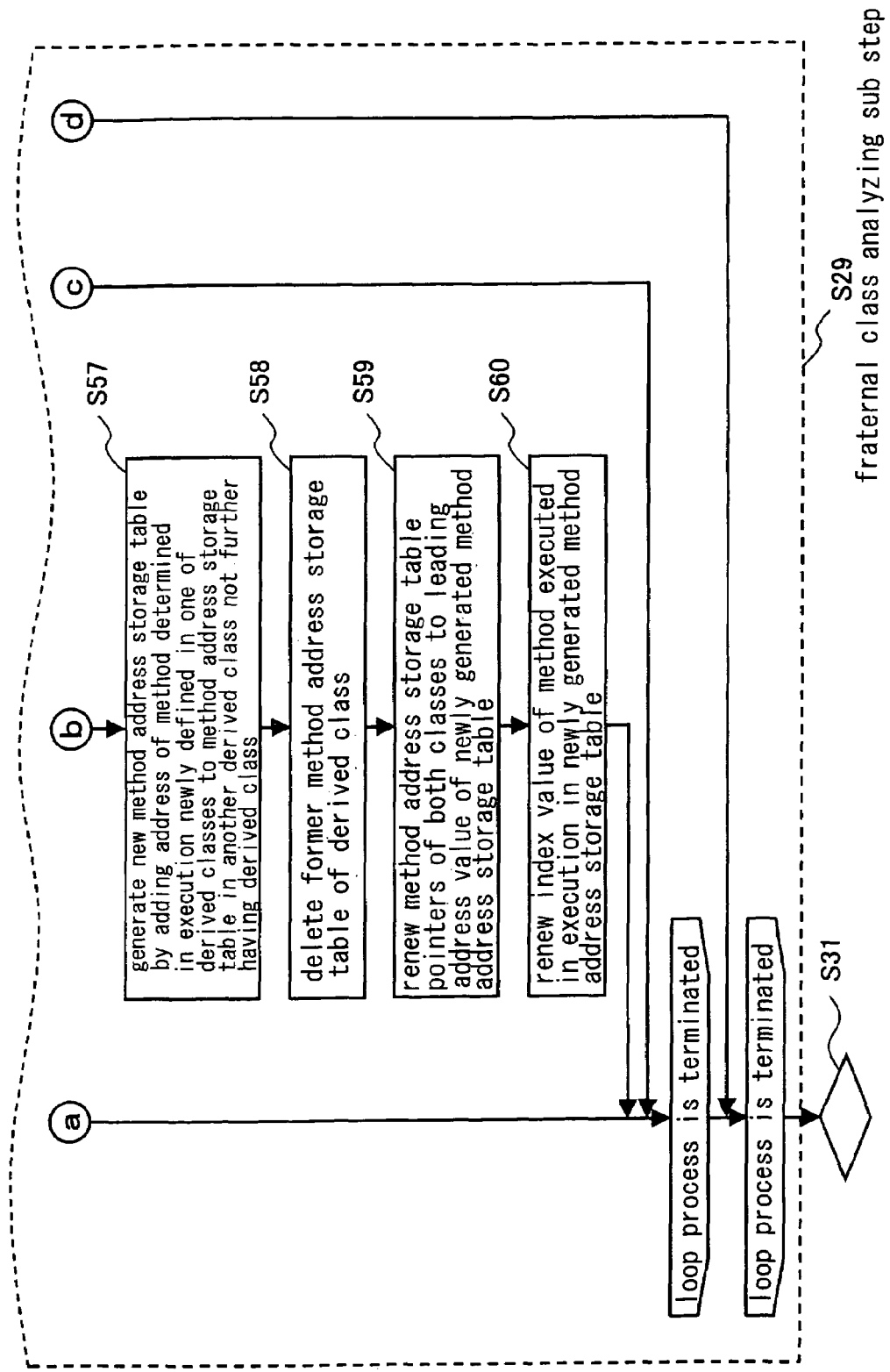
FIG. 6 is a (second) flow chart illustrating details of the fraternal-class analyzing sub step according to the embodiment.

FIGS. 5 and 6 are flow charts respectively illustrating details of the fraternal class analyzing sub step (S29).

The compiler repeatedly executes a loop process (S50) to combination of the base and derived classes within the analyzing range as follows. The compiler judges whether or not at least two derived classes overriding none of the methods determined in the execution in the base classes are present (S51). The compiler repeatedly executes a loop process (S52) to a pair of derived classes selected from the non-overriding derived classes as follows in the presence of the at least two non-overriding derived classes (Yes in S51). In contrast, when there is at most one non-overriding derived class (No in S51) the loop process (S50) is executed to the next combination of the base and derived classes.

In the loop process (S52), the compiler selects the pair of derived classes from the non-overriding derived classes and judges whether or not the pair of derived classes both newly define the method determined in the execution (S53). When it is judged that the pair of derived classes both newly define the method determined in the execution (Yes in S53), the compiler judges whether or not the both of the pair of derived classes further have the derived class (S56).

When it is judged that the both of the pair of derived classes do not newly define the method determined in the execution, in other words, at least one of the pair of derived classes does not newly define the method determined in the execution (No in S53), the compiler deletes the method address storage table of the derived class in which the new method determined in the execution is not defined (one of the pair of derived classes when the both of them do not newly define the method determined in the execution) (S54). Then, the compiler renews all of the method address storage table pointers that were referencing the deleted method address storage table (including the method address storage table pointer of the derived class whose method is deleted) (S55) by renewing the pointers to the leading address value of the method address storage table of the other derived class overriding none of the methods determined in the execution in the base classes. After the process of S55 is executed, the loop process (S52) is executed to a next pair of non-overriding derived classes.

When the both of the pair of derived classes further have the derived class (Yes in S56), the loop process (S52) is executed to a next pair of non-overriding derived classes.

When it is judged in the step of S56 that the both of the pair of derived classes do not further have the derived class, in other words, at least one of the pair of derived classes further has the derived class (No in S56), the compiler newly generates the method address storage table (S57). In the method address storage table newly generated in S57, the method address storage table of the one of the pair of derived classes not further having the derived class (one of the pair of derived classes when the both of them do not further have the derived class) additionally includes an address of the method determined in the execution newly defined in the other of the pair of derived classes.

Next, the compiler deletes the former method address storage table corresponding to the newly generated method address storage table (S58). Then, the compiler renews all of the method address storage table pointers that were referencing the deleted method address storage table (including the method address storage table pointer of the both derived classes) to the leading address value of the newly generated method address storage table (S59). The compiler then renews the method index value of the method determined in the execution in the newly generated method address storage table (S60), and executes the loop process (S52) again to a next pair of non-overriding derived classes. When all of the loop processes (S50 and S52) are completed, a judging process (S31) is then executed.

Referring to the flow chart of FIG. 3 again, when it is judged in S27 that the succeeding relationship between the classes is not used (No in S27), the compiler executes a method address inclusion analyzing sub step (S30).

Figure 7:
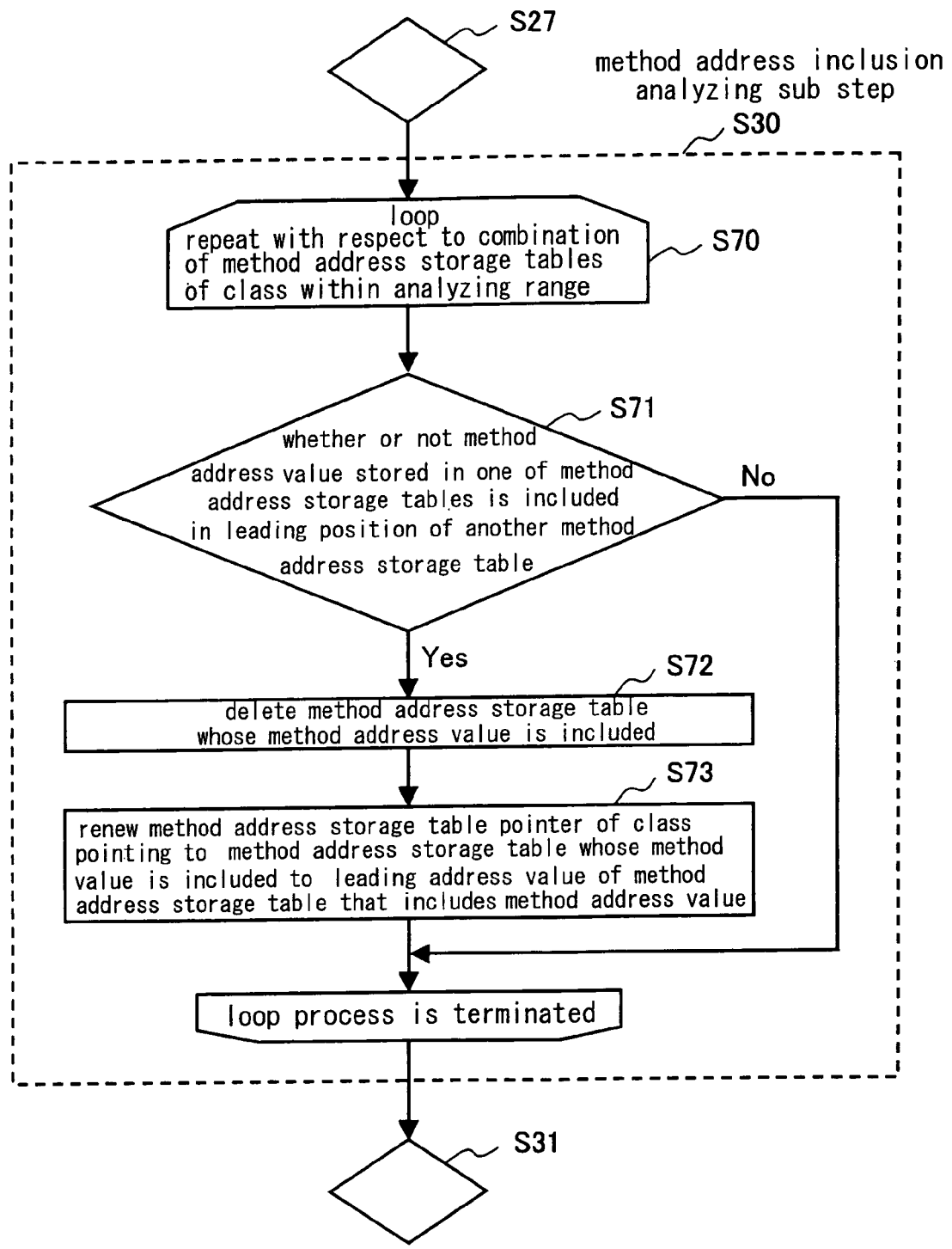
FIG. 7 is a flow chart illustrating details of a method address inclusion analyzing sub step according to the embodiment.

FIG. 7 is a flow chart illustrating details of the method address inclusion analyzing sub step (S30). The compiler repeatedly executes a loop process (S70) to combination (pair) of the method address storage tables of the classes within the analyzing range as follows. The compiler judges whether or not a method address value stored in one of the method address storage tables is included in a leading position of the other method address storage table (S71).

When it is judged in S71 that the method address value is included (Yes in S71), the method address storage table whose method address value is included is deleted (S72). Then, the method address storage table pointer of the class pointing to the method address storage table whose method address value is included is renewed to the leading address value of the method address storage table that includes the method address value (S73). Thereafter, the loop process (S70) is again executed to the next combination of the method address storage tables.

When it is judged in S71 that the method address value is not included (No in S71), the loop process (S70) is executed again to the next combination of the method address storage tables. When the loop process (S70) with respect to all of the combination is completed, the method address inclusion analyzing sub step S30 is completed. Then, the judging process (S31) shown in FIG. 3 is executed.

The judging process (S31) judges whether or not details of the optimization are displayed. In doing so, the display of the optimization details may be designated by means of the designation of the option of the command line or the pragma described in the source program.

When it is judged in S31 that the details of the optimization are displayed (Yes in S31), the compiler outputs the class that was referencing the method address storage table to be optimized, the method address storage table prior to the optimization and the optimized method address storage table at least to a standard output. Thereby, the method address storage table optimizing step (S11) is completed.

When it is judged in S31 that the details of the optimization are not displayed (No in S31), the compiler terminates the method address storage table optimizing step (s11) without executing any process.

As described, the analyzing-target information extracting step (S10), method address storage table optimizing step (S11) and optimizing step (S4) including the another optimizing step (S12) are executed to the intermediate code. Thereafter, the resource allocating step (S5) and the object program outputting step (S6) are executed to the intermediate code. As a result, the object code of the object program generated can be ultimately downsized.

Below is described in detail the method address storage table optimizing step referring to working examples using the C++ language. The working examples are described based on the assumption that the method determined in the execution is a virtual function, the method address storage table is a virtual function table (vtbl), and the method address storage table pointer is a virtual function table pointer (vptr).

WORKING EXAMPLE 1

FIG. 8 shows an example of the header file and the source program memorized in the program memorizing unit D1. Below is described an operation of the compiler when the header file and the source program are inputted.

In a header file, [class.h] shown in FIG. 8, definitions of class A, class B, class C, class D, class E and class F are recited. In each class, a constructor and a destructor are defined. In the class A, virtual functions, vfunc1 and vfunc2, are defined. In the class B, which succeeds to the class A, a virtual function vfunc3 is defined. The class C succeeds to the class B. In the class D, which succeeds to the class B, a virtual function vfunc4 is defined. In the class E, which succeeds to the class B, a virtual function vfunc5 is defined. In the class F, which succeeds to the class A, the virtual function vfunc2 defined in the class A is overridden (redefined).

First, the header file [class.h] is read into source files, [file1.cpp] and [file2.cpp] shown in FIG. 8 based on a #inlude instruction. Further, in the source files, external functions f, g, h, i and main are defined, in which the virtual function is called.

Figure 9:
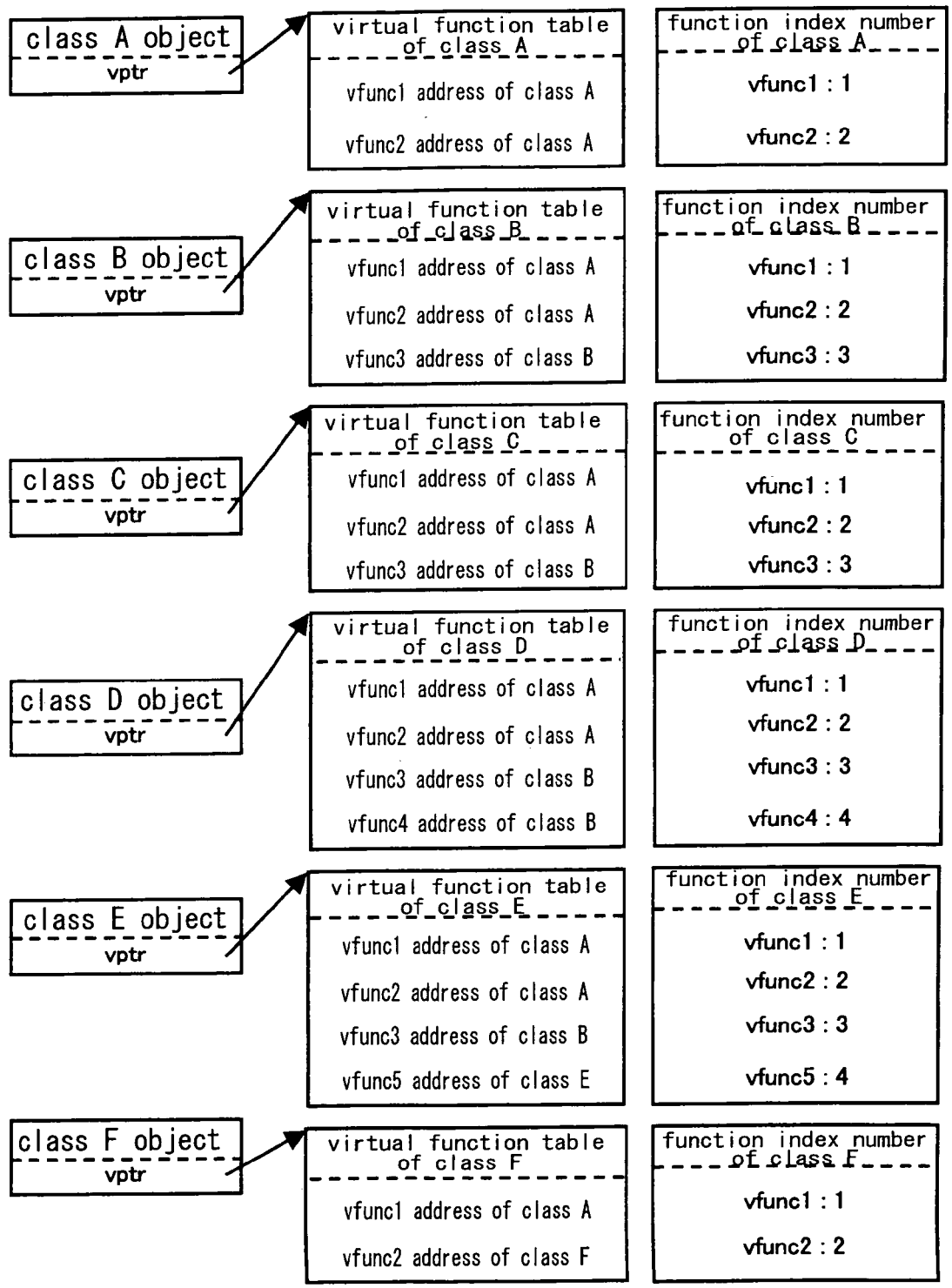
FIG. 9 shows an example of a virtual function table information before optimization according to the embodiment is executed.

In the conventional technology in which the virtual function table is not optimized between the classes, the virtual function tables are directly outputted to the respective classes. FIG. 9 shows the virtual function tables corresponding to the respective classes and the index numbers of the virtual functions in the respective classes. The virtual function tables of the classes store all of addresses of the virtual functions that can be called by the respective classes.

Next, a working example 1 according to the embodiment is shown. As set conditions of the working example 1, the user gives the compiler the instructions that the analysis is conducted within the range of [file1.cpp], the succeeding relationship between the classes is used and the details of the optimization are displayed.

First, the analyzing-target information extracting step (S10) is executed. It is judged in the step S10, first, whether or not the analyzing range is limited (S21). Because it is confirmed that the analyzing range is limited according to the set conditions mentioned earlier, the virtual function table information, class informations and function reference information in the range of ⌈file1.cpp⌋ are extracted (S22). FIG. 10 shows the respective class informations and function reference information that are extracted. The extracted virtual function table information is shown in FIG. 9.

Next, it is judged if there is any unreferenced virtual function (S24). As shown in the function reference information in FIG. 10, it can be confirmed that vfunc1 is referenced but it is unknown whether or not the other virtual functions are referenced in the analysis in the range of ⌈file1.cpp⌋. Therefore, there is no deletion of any particular virtual function address from the virtual function table.

Next, the compiler executes the method address storage table optimizing step (S11). First, it is judged in the step S11 whether or not the succeeding relationship between the classes is used (S27). Because it is confirmed that the succeeding relationship between the classes is used according to the set conditions of the working example 1 as described, the parent-child class analyzing sub step (S28) is then executed.

In the parent-child analyzing sub step (S28), the following process is executed to combination of the base and derived classes within the analyzing range (S40). First, it is judged if there is at least one derived class overriding none of the virtual functions of the base classes in the combination of the base and derived classes, which are the class A, class B and class F (S41).

According to the class informations shown in FIG. 10, the class F overrides the virtual function vfunc2, while the class B does not override any virtual function. Therefore, as shown in FIG. 1, the virtual function table of the class A as the base class is deleted (S42), and the virtual function table pointer (vptr) of the class A is renewed so as to point to the virtual function table of the class B. (S43)

Next, the same judging process (S41) is executed to the combination of the base and derived classes, which are the class B, class C, class D and class E. According to the class informations shown in FIG. 10, none of the classes C, D and E overrides the virtual function, which is detected in the step S41. Then, as shown in FIG. 12, the virtual function table of the class B as the base class is deleted (S42). Further, the virtual function table pointer of the class B and the virtual function table pointer of the class A that was referencing the deleted virtual function table are renewed so as to point to the virtual function table of the class C as the first detection target (S43). The loop process (S40) with respect to all of the subjects is completed, and the fraternal class analyzing sub step (S29) is then executed.

In the fraternal class analyzing sub step (S29), the following process is executed to combination of the base and derived classes within the analyzing range (S50). First, it is judged if there are at least two derived classes overriding none of the virtual functions of the base class in the combination of the base and derived classes, which are the class A, class B and class F (S51).

It is known from the class informations shown in FIG. 10 that there are not two, and therefore, the same judgment (S51) is executed to the next combination of the class B, class C, class D and class E. Because none of the class C, class D and class E overrides the virtual function according to the class informations shown in FIG. 10, the following process is repeatedly executed to the combination of the non-overriding derived classes, which are class C, class D and class E (S52).

Figure 13:
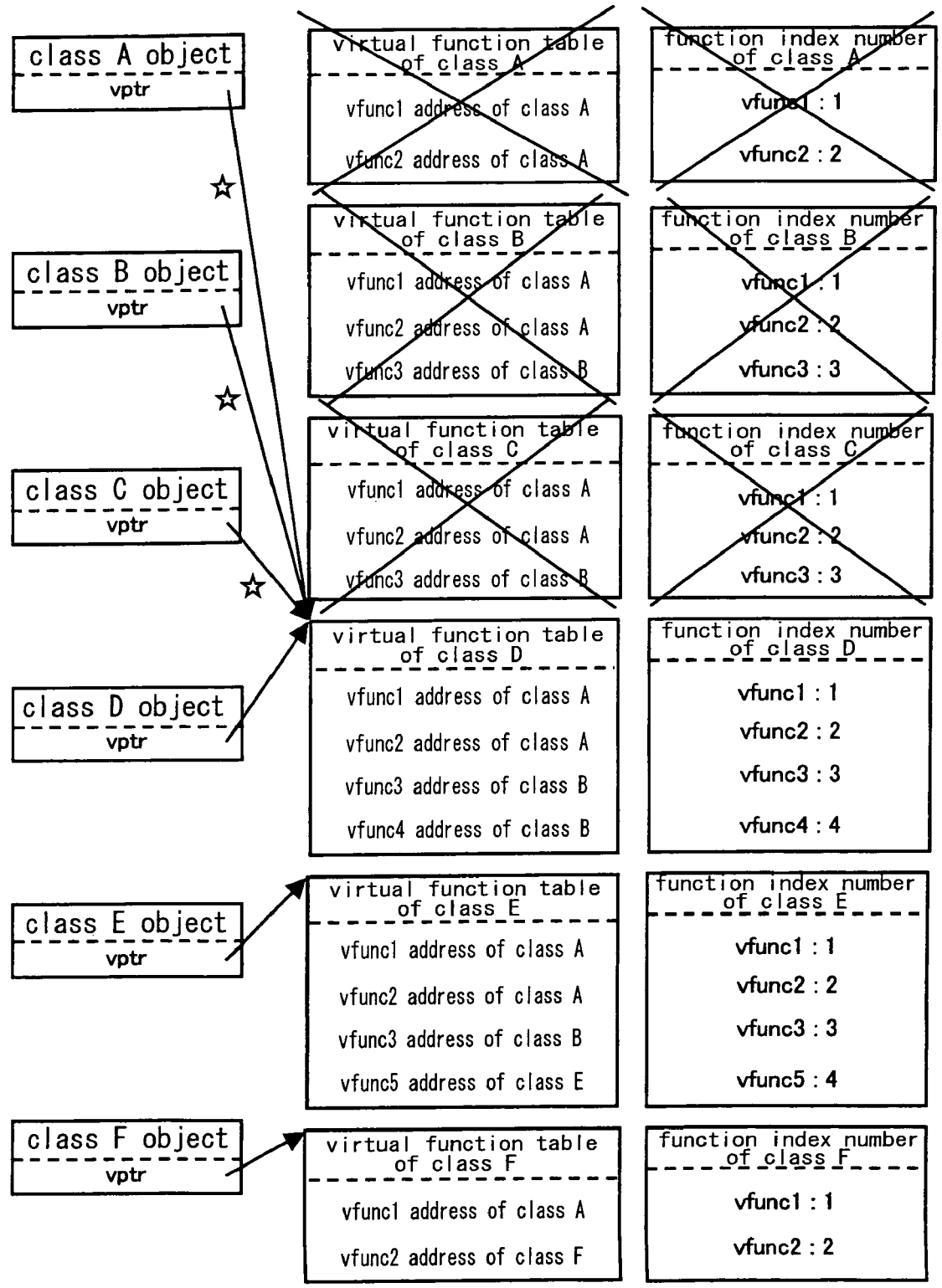
FIG. 13 shows an example of the virtual function table information after a first loop of the fraternal class analyzing sub step is executed in the working example 1 according to the embodiment and an example of the virtual function table information after a third loop of the method address inclusion analyzing sub step is executed in the working example 2 according to the embodiment.

First, it is judged whether or not the virtual function is newly defined in the both of the class C and the class D (S53). The new virtual function is not defined in the class C according to the class informations shown in FIG. 10. Therefore, the virtual function table of the class C is deleted (S54) as shown in FIG. 13, and the virtual function table pointer of the class c and the virtual function table pointers of the class A and the class B that were referencing the deleted virtual function table are renewed so as to point to the virtual function table of the class D (S55).

Next, it is judged whether or not the new virtual function is defined in the both of the class D and the class E (S53). The new virtual function is defined in the class D and the class E both according to the class informations shown in FIG. 10, and then, it is judged whether or not the derived classes in the both classes further have the derived class (S56). It is learnt from the class informations shown in FIG. 10, neither the class D nor the class E further has the derived class. Therefore, any of the two classes may be selected as the base class in the process of generating the new virtual function table (S57).

As shown in FIG. 14, the new virtual function table is newly generated in such manner that an address of the virtual function vfunc 5 newly defined in the virtual function table of the class E is added to the virtual function table of the class D (S57), and the former virtual function tables of the former class are deleted (S58). Then, the virtual function address pointers of the both classes and the virtual function address pointers of the class A, class B and class C that were referencing the deleted virtual function table are renewed so as to point to the newly generated virtual function table. Further, as shown in FIG. 14, the function index number is also renewed based on the newly generated function table (S60).

The loop process (S50) with respect to all of the subjects is completed. Next, it is judged whether or not the instruction for displaying the details of the optimization is given by the user (S31).

Because the instruction for displaying the details of the optimization is given by the user as described earlier, the class that was referencing the virtual function table to be optimized, virtual function table prior to the optimization and virtual function table after the optimization are outputted to the standard output as shown in FIG. 15.

As a result of the described processes, the intermediate code in which the method address storage table is optimized can be obtained. FIG. 16 shows a result of outputting an assembler from the intermediate code not subjected to the optimization and the optimized intermediate code.

As shown in FIG. 16, the code size is reduced by 44 bytes as a result of the optimization in comparison to the non-optimized intermediate code. The code size is obtained by multiplying the number of "DD by ⌈4⌋.

Thus, the virtual function tables, which were separately outputted in response to the respective classes in the conventional technology, can be optimized to be thereby collectively outputted. As a result, the code size can be reduced.

WORKING EXAMPLE 2

A working example 2 does not include in its set conditions one of the set conditions in the working example 1, that is the use of the succeeding relationship between the classes. Therefore, the process flow in the working example 2 through to the judgment on the use of the succeeding relationship between the classes (S27) is the same as described in the working example 1 so that the virtual function table information shown in FIG. 9 is extracted. In the working example 2, it is then judged that the succeeding relationship between the classes is not used in S27, and thereafter, the method address inclusion analyzing sub step (S30) is executed.

In the method address inclusion analyzing sub step (S30), the following process is repeatedly executed to combination of the virtual function tables of the classes within the analyzing range (S70).

Figure 11:
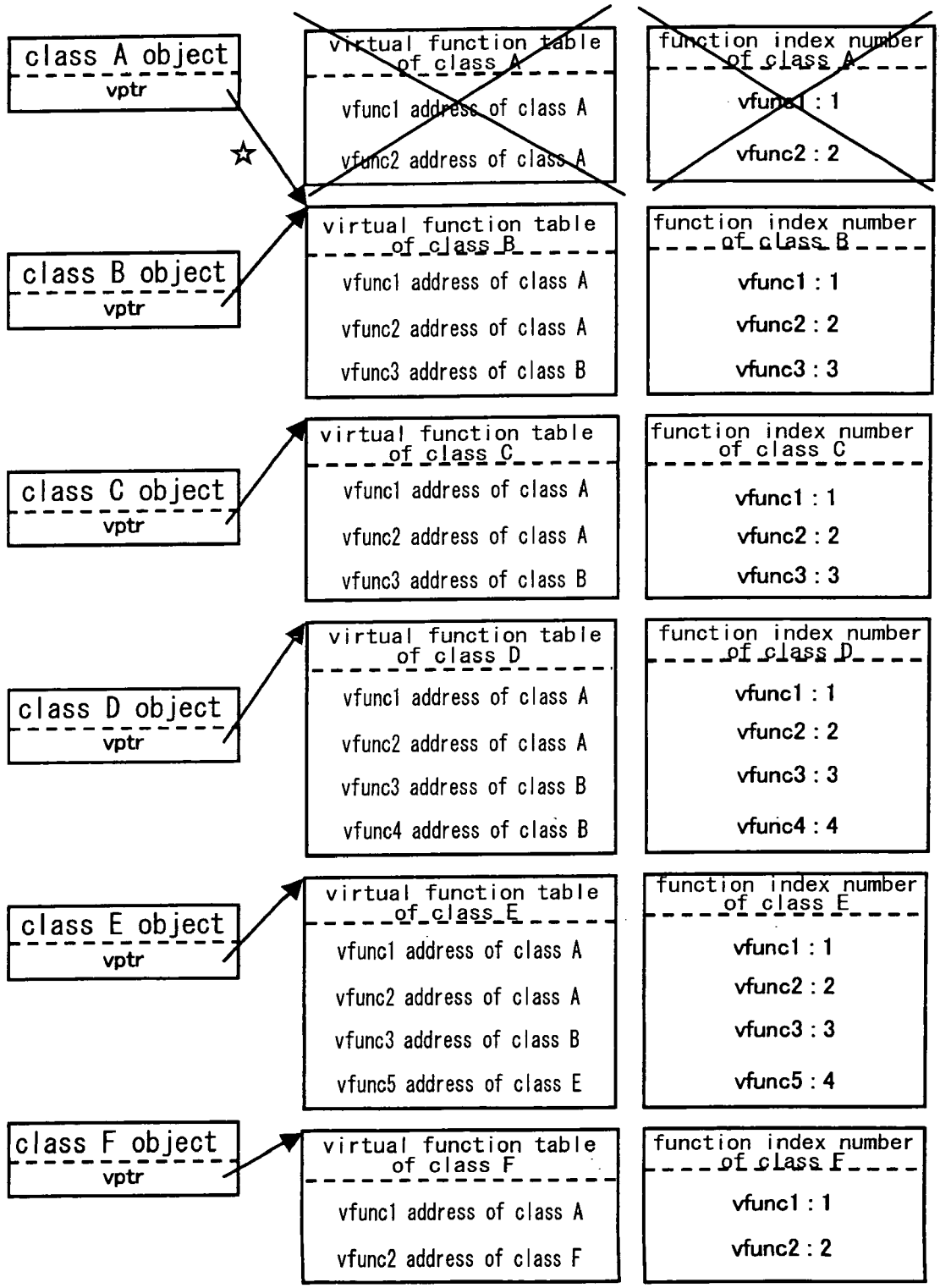
FIG. 11 shows an example of the virtual function table information after a first loop of the parent-child class analyzing sub step is executed in the working example 1 according to the embodiment and an example of the virtual function table information after a first loop of the method address inclusion analyzing sub step is executed in the working example 2 according to the embodiment.

First, it is judged, in the virtual function tables of the class A and the class B, whether or not the virtual function address stored in one of the virtual function tables is included in the leading position of the other virtual function address table (S71). Referring to FIG. 9, the virtual function address stored in the virtual function table of the class A is included in the virtual function table of the class B. Therefore, the virtual function table of the class A, whose virtual function address is included in the other, is deleted (S72). Then, the virtual function table pointer of the class A is renewed so that the virtual function table pointer that was referencing the deleted table points to the virtual function table of the class B that includes the virtual function address (S73). The result thereby obtained is the same as that of the working example 1 shown in FIG. 11. In the same manner, the result obtained by executing S70 to the class B and the class C corresponds to FIG. 12, and the result obtained by executing S70 to the class C and the class D corresponds to FIG. 13.

According to the foregoing processes, the intermediate code in which the method address storage table is commonly used can be obtained. FIG. 17 shows a result of outputting the assembler from the intermediate code not subjected to the optimization and the optimized intermediate code. As shown in FIG. 17, the code size is reduced by 32 bytes as a result of the optimization in comparison to the non-optimized intermediate code.

Thus, when the succeeding relationship between the classes is not used, though the efficiency in the optimization is lessened in comparison to the case where the succeeding relationship is used, the processing algorithm is simplified and it becomes unnecessary to analyze the succeeding relationship. As a result, the optimization can be accelerated.

WORKING EXAMPLE 3

A working example 3 does not include in its set conditions one of the set conditions in the working example 1, that is the analysis is conducted within the range of [file1.cpp], and instead employs as one of the set conditions that the analysis is conducted to the entire source program.

First, the analyzing-target information extracting step (S10) is executed. It is judged in the step S10 whether or not the analyzing range is limited (S21). It is known from the foregoing set conditions that the analyzing range is not limited (the analysis is conducted to the entire source program). Therefore, the virtual function table information, class informations and function reference information with respect to the entire source program are extracted (S23) FIG. 18 shows the extracted class informations and the function reference information. The extracted virtual function table information corresponds to that of the working example 1, which is shown in FIG. 9.

Next, it is judged whether or not there is any unreferenced virtual function (S24). It is known from the function reference information shown in FIG. 18 that the virtual function vfunc2 is not referenced in the analysis with respect to the entire program. Therefore, of the class informations shown in FIG. 18, the virtual function address of vfunc2, which is the unreferenced virtual function, is deleted from the information of the unreferenced virtual function vfunc2 and the virtual function table (S25). Then, the virtual function index number is renewed based on the virtual function table after the deletion (S26).

FIG. 19 shows the class informations from which the unreferenced virtual function is deleted. FIG. 20 shows a result of deleting the unreferenced virtual function address from the virtual function tables and renewing the index numbers.

Next, the compiler executes the method address storage table optimizing step (S11). First, it is judged in the step S11 whether or not the succeeding relationship between the classes is used (S27). As described earlier, the succeeding relationship between the classes is used according to the set conditions of the working example 3. Therefore, the parent-child class analyzing sub step (S28) is executed next.

In the parent-child analyzing sub step (S28), the following process is executed to combination of the base and derived classes within the analyzing range (S40). First, it is judged if there is at least one derived class overriding none of the virtual functions of the base classes in the combination of the base and derived classes, that are the class A, class B and class F (S41).

According to the class informations shown in FIG. 19, neither the class B nor the class F overrides any the virtual function. Therefore, the virtual function table of the class A as the base class is deleted (S42), and the virtual function table pointer (vptr) of the class A is renewed so as to point to the virtual function table of the class B (S43) in the same manner as in the working example 1.

Next, the same judging process (S41) is executed to the combination of the base and derived classes, that are the class B, class C, class D and class E. According to the class informations shown in FIG. 19, none of the class B, class C, class D and class E overrides any of the virtual functions, which is detected in the step S41.

Figure 21:
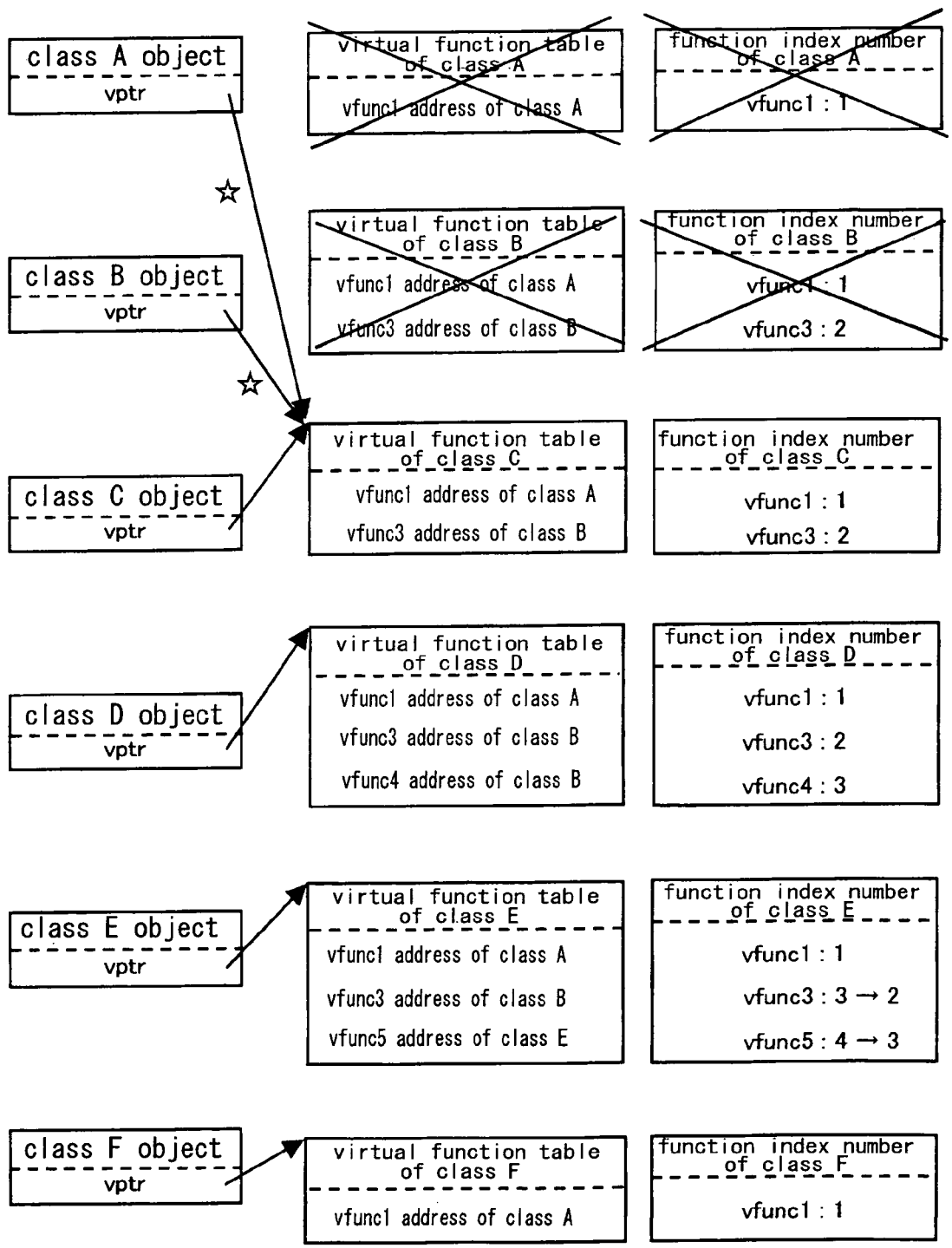
FIG. 21 shows an example of the virtual function table information after the second loop of the parent-child class analyzing sub step is executed in the working example 3 according to the embodiment.

In the working example 3, the virtual function table of the class B as the base class is then deleted (S42) in the same manner as in the working example 1. Further, the virtual function table pointer of the class B and the virtual function table pointer of the class A that was referencing the deleted virtual function table are renewed so as to point to the virtual function table of the class C as the first detection subject (S43). The virtual function tables as a result of the processes so far are shown in FIG. 21. The loop process (S40) with respect to all of the subjects is completed. Then, the fraternal class analyzing sub step (S29) is executed.

In the fraternal class analyzing sub step (S29), the following process is executed to combination of the base and derived classes within the analyzing range (S50). First, it is judged if there are at least two derived classes overriding none of the virtual functions of the base classes in the combination of the base and derived classes, that are the class A, class B and class F (S51).

In the class informations before the unreferenced virtual function address is deleted therefrom (FIG. 18), the judgment result was false because the vfunc 2 was overridden in the class F. However, because the unreferenced virtual function has been deleted now, none of the class B, class F and class A overrides the virtual function of the class A according to the class informations shown in FIG. 19. Therefore, it is judged in the step S51 that there are two non-overriding derived classes overriding. As a result, the following process is repeatedly executed to a pair of derived classes selected from the class B and class F (class B and class F in this case) (S52).

First, it is judged whether or not the both of the classes B and F newly define the virtual function (S53). Because the class F does not define the new virtual function according to the class informations shown in FIG. 19, the virtual function table of the class F is deleted here (S54), and the virtual function table pointer of the class F is renewed so as to point to the virtual function table of the class C (which is, at this stage, the virtual function table commonly used by the classes A and B) (S55). The virtual function table information at this stage is shown in FIG. 22.

The judging process of the step S51 is executed to the next combination of the class B, class C, class D and class E in the same manner. According to the class informations shown in FIG. 18, none of the class C, class D and class E overrides any virtual function. Then, the process of the step S52 is repeatedly executed to pair of derived classes selected from the class C, class D and class E.

Figure 23:
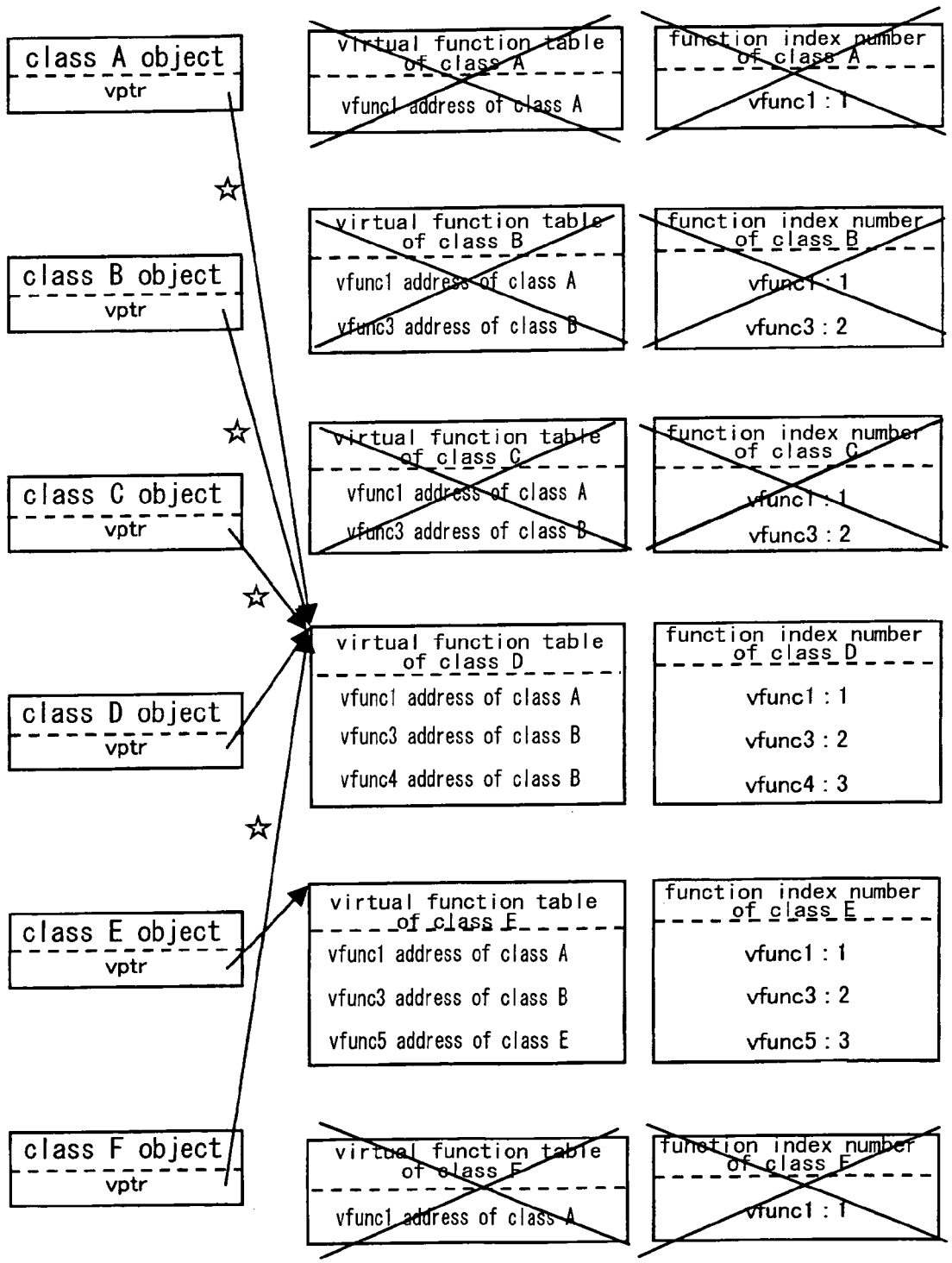
FIG. 23 shows an example of the virtual function table information after the first loop of the fraternal class analyzing sub step is executed in the working example 3 according to the embodiment.
Figure 26:
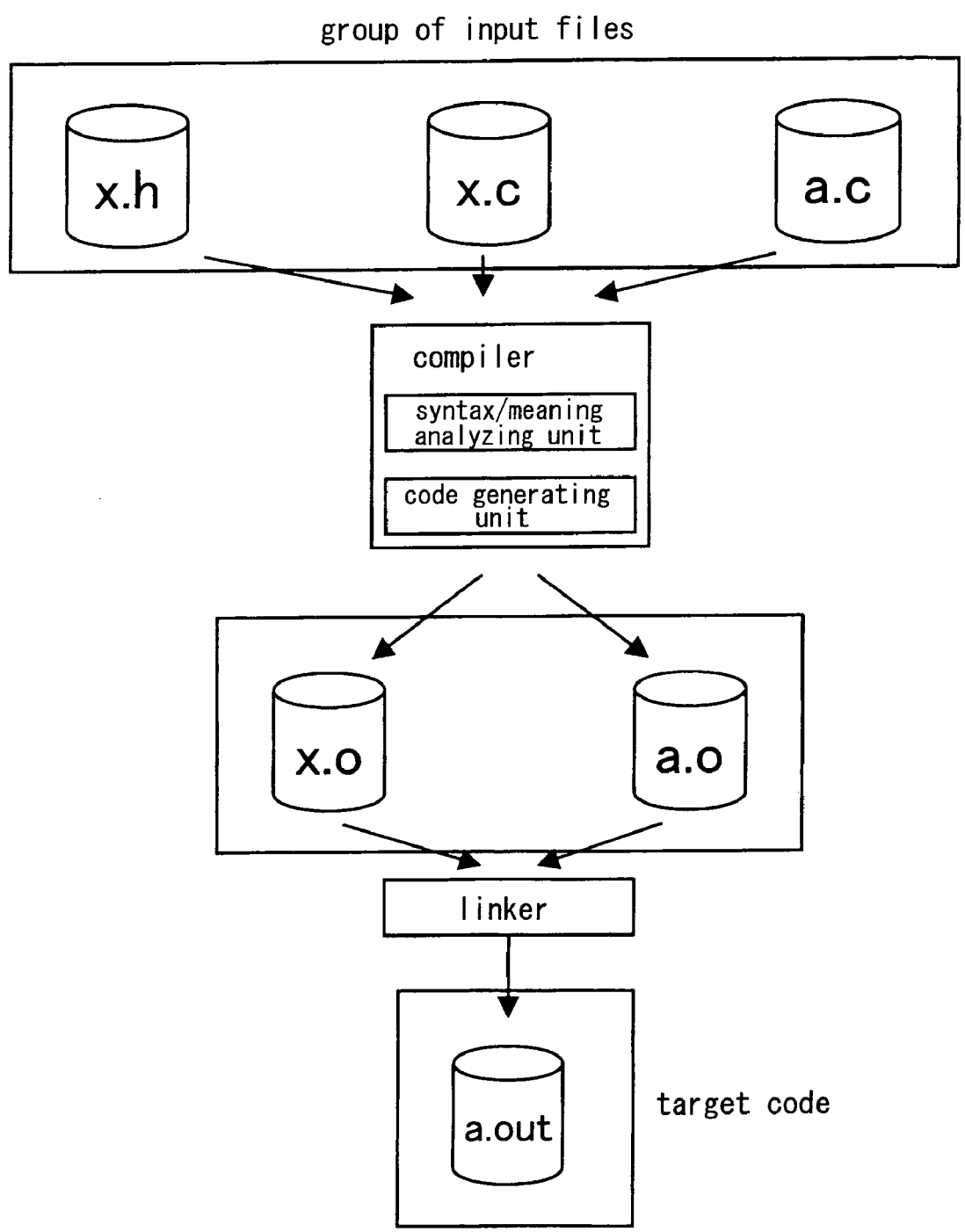
FIG. 26 is an illustration of a conventional technology.

First, it is judged whether or not the both of the classes C and D define the new virtual function (S53). According to the class informations shown in FIG. 19, the class C does not define the new virtual function. Then, the process shifts to the step S54, in which the virtual function table of the class C is deleted. Further, the virtual function table pointer of the class C and the virtual function table pointers of the class A, class B and class F that were referencing the deleted virtual function are renewed so as to point to the virtual function table of the class D (S55). The virtual function table information at this stage is shown in FIG. 23.

Next, it is judged whether or not the both of the classes D and E define the new virtual function (S53). According to the class informations shown in FIG. 19, the class D and the class E both define the new virtual function. Therefore, the process shifts to the step S56, in which it is judged whether or not the both of the derived classes further have the derived class. According to the class informations shown in FIG. 19, neither the class D nor the class E further has the derived class. Then, the process shifts to the step S57, in which the virtual function table is newly generated. Any class may be selected as the base class in the generation process.

AS shown in FIG. 24, the address of the virtual function vfunc5 newly defined in the virtual function table of the class E is added to the virtual function table of the class D so that the virtual function table is newly generated (S57). Then, the former virtual function tables of the both classes are deleted (S58). Then, the virtual function address pointers of the both classes and the virtual function address pointers of the class A, class B, class C and class F that were referencing the deleted virtual function tables are renewed so as to point to the newly generated virtual function table.

Further, as shown in FIG. 24, the function index number are also renewed based on the newly generated virtual function table (S60). The loop process (S50) with respect to all of the subjects is completed. Next, it is judged whether or not the instruction for displaying the details of the optimization is given by the user (S31). The process thereafter, which is the same as described in the working example 1, is not described here again.

As a result of the foregoing processes, the intermediate code in which the method address storage table is optimized can be obtained. FIG. 25 shows a result of outputting the assembler from the intermediate code not subjected to the optimization and the optimized intermediate code. As shown in FIG. 25, the code size is reduced by 56 bytes as a result of the optimization in comparison to the non-optimized intermediate code.

Thus, the virtual function table can be downsized when the unreferenced virtual function is deleted. Further, as described in the working example 3, the virtual function tables can be collectively outputted when the function (vfunc2) subjected to the overriding is not referenced so that the code size can be reduced.

As thus far described, according to the present embodiment, the redundant output of the method address storage tables with respect to the different classes can be avoided so that the object code reduced in code size can be generated.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A compiling method for converting a source program described in an object-oriented language into an object code comprising:

an intermediate code generating step for generating an intermediate code from the source program;

an analyzing-target information extracting step for extracting a method address storage table information, a class information and a function reference information from the intermediate code, wherein the method address storage table information includes at least a method address storage table, a method address storage table pointer for pointing to the method address storage table and a method index number corresponding to the method address storage table, the class information includes at least a base class name, a derived class name, a name of a new method determined in execution and an overridden method, and the function reference information is an information showing whether or not each method is referenced in the program;

a method address storage table optimizing step for optimizing the intermediate code by executing a process of analyzing the extracted analyzing-target information and deleting the method address storage table of each class when it is detected from the analysis that none of the methods determined in the execution is overridden in one of the classes by the other class, a process of generating the method address storage table commonly usable in the both classes and a process of renewing the method address storage table pointer of the both classes to a leading address value of the generated method address storage table commonly usable in the both classes;

wherein the method address storage table information, the class information and the function reference information are extracted within a limited analyzing range when an analyzing-range limiting information including at least one of a file name, a function name and the class name is supplied to a compiler for executing the compiling method in the analyzing-target information extracting step; and an object code converting step for converting the optimized intermediate code into the object code.

2. A compiling method as claimed in claim 1, wherein when any method determined in the execution that is defined but not referenced yet is present, a process of deleting all of the methods determined in the execution that are defined but not referenced yet from the class information and the method address storage table and a process of renewing the index number of the method determined in the execution in the method address storage table after the implementation of the deleting process are executed in the analyzing-target information extracting step.

3. A compiling method as claimed in claim 1, wherein
a process of deleting the method address storage table of the base class and a process of renewing the method address storage table pointer of the base class to a leading address value of the method address storage table of a derived class overriding none of the methods determined in the execution in a base classes are executed when there is at least one derived class overriding none of the methods determined in the execution in the base classes so that the intermediate code is optimized in the method address storage table optimizing step.

4. A compiling method as claimed in claim 1, wherein
when at least two derived classes override none of the methods determined in the execution in the base classes and at least one of a pair of derived classes selected from the at least two derived classes does not newly define the method determined in the execution, a process of deleting the method address storage table of the derived class in which the method determined in the execution is not newly defined and a process of renewing the method address storage table pointer of the derived class from which the method address storage table is deleted to a leading address value of the method address storage table of the other derived class overriding none of the methods determined in the execution in the base classes are executed so that the intermediate code is optimized in the method address storage table optimizing step.

5. A compiling method as claimed in claim 1, wherein
when at least two derived classes override none of the methods determined in the execution in the base classes, a pair of derived classes selected from the at least two derived classes both newly define the method determined in the execution, and at least one of the pair of derived classes further has a derived class, a process of newly generating the method address storage table by adding an address of the method determined in the execution newly defined in the one of the pair of derived classes to the method address storage table of the other of the pair of derived classes not further having the derived class and eliminating the former method address storage table, a process of renewing the method address storage table pointer of the pair of derived classes to a leading address value of the method address storage table newly generated, and a process of renewing the index value of the method determined in the execution in the method address storage table newly generated are executed so that the intermediate code is optimized in the method address storage table optimizing step.

6. A compiling method as claimed in claim 1, wherein
when the method address storage tables of the respective classes are compared and a method address value stored in one of the method address storage tables is included in a leading position of the other method address storage table, a process of deleting the method address storage table whose method address value is included in the other, and a process of renewing the method address storage table pointer of the class pointing to the method address storage table whose address value is included in the other to a leading address value of the method address storage table that includes the method address value are executed so that the intermediate code is optimized in the method address storage table optimizing step.

7. A compiling method as claimed in claim 1, wherein
when an instruction for displaying details of the executed optimization is supplied to a compiler, the class referencing the method address storage table to be optimized, the method address storage table prior to the optimization and the optimized method address storage table are outputted at least to a standard output in the method address storage table optimizing step.

8. A compiling method as claimed in claim 1, wherein
the object-oriented language is the C++ language, the method determined in the execution is a virtual function, the method address storage table is a virtual function table, and the method address storage table pointer is a virtual function table pointer.

9. A computer-executable compiling program stored on a computer-readable recording medium for converting a source program described in an object-oriented language into an object code comprising:

an intermediate code generating feature for generating an intermediate code from the source program;

an analyzing-target information extracting feature for extracting a method address storage table information, a class information and a function reference information from the intermediate code, wherein the method address storage table information includes at least a method address storage table, a method address storage table pointer for pointing to the method address storage table and a method index number corresponding to the method address storage table, the class information includes at least a base class name, a derived class name, a name of a new method determined in execution and an overridden method, and the function reference information is an information showing whether or not each method is referenced in the program;

a method address storage table optimizing feature for optimizing the intermediate code by executing a process of analyzing the extracted analyzing-target information and deleting the method address storage table of each class when it is detected from the analysis that none of the methods determined in the execution is overridden in one of the classes by the other class, a process of generating the method address storage table commonly usable in the both classes and a process of renewing the method address storage table pointer of the both classes to a leading address value of the generated method address storage table commonly usable in the both classes;

wherein the method address storage table information, the class information and the function reference information are extracted within a limited analyzing range when an analyzing-range limiting information including at least one of a file name, a function name and a class name is supplied to a compiler for executing the present compiling method in the analyzing-target information extracting feature; and an object code converting feature for converting the optimized intermediate code into the object code.

10. A computer-executable compiling program as claimed in claim 9, wherein
when any method determined in the execution that is defined but not referenced yet is present, a process of deleting all of the methods determined in the execution that are defined but not referenced yet from the class information and the method address storage table and a process of renewing the index number of the method determined in the execution in the method address storage table after the implementation of the deleting process are executed in the analyzing-target information extracting feature.

11. A computer-executable compiling program as claimed in claim 9, wherein
a process of deleting the method address storage table of a base class and a process of renewing the method address storage table pointer of the base class to a leading address value of the method address storage table of a derived class overriding none of the methods determined in the execution in the base classes are executed when there is at least one derived class overriding none of the methods determined in the execution in the base classes so that the intermediate code is optimized in the method address storage table optimizing feature.

12. A computer-executable compiling program as claimed in claim 9, wherein
when at least two derived classes override none of the methods determined in the execution in the base classes and at least one of a pair of derived classes selected from the at least two derived classes does not newly define the method determined in the execution, a process of deleting the method address storage table of the derived class in which the method determined in the execution is not newly defined and a process of renewing the method address storage table pointer of the derived class from which the method address storage table is deleted to a leading address value of the method address storage table of the other derived class overriding none of the methods determined in the execution in the base classes are executed so that the intermediate code is optimized in the method address storage table optimizing feature.

13. A computer-executable compiling program as claimed in claim 9, wherein
when at least two derived classes override none of the methods determined in the execution in the base classes, a pair of derived classes selected from the at least two derived classes both newly define the method determined in the execution, and at least one of the pair of derived classes further has a derived class, a process of newly generating the method address storage table by adding an address of the method determined in the execution newly defined in the one of the pair of derived classes to the method address storage table of the other of the pair of derived classes not further having the derived class and eliminating the former method address storage table, a process of renewing the method address storage table pointer of the pair of derived classes to a leading address value of the method address storage table newly generated, and a process of renewing the index value of the method determined in the execution in the method address storage table newly generated are executed so that the intermediate code is optimized in the method address storage table optimizing feature.

14. A computer-executable compiling program as claimed in claim 9, wherein
when the method address storage tables of the respective classes are compared and a method address value stored in one of the method address storage tables is included in a leading position of the other method address storage table, a process of deleting the method address storage table whose method address value is included in the other, and a process of renewing the method address storage table pointer of the class pointing to the method address storage table whose address value is included in the other to a leading address value of the method address storage table that includes the method address value are executed so that the intermediate code is optimized in the method address storage table optimizing feature.

15. A computer-executable compiling program as claimed in claim 9, wherein
when an instruction for displaying details of the executed optimization is supplied to a compiler, the class referencing the method address storage table to be optimized, the method address storage table prior to the optimization and the optimized method address storage table are outputted at least to a standard output in the method address storage table optimizing feature.

16. A computer-executable compiling program as claimed in claim 9, wherein
the object-oriented language is the C++ language, the method determined in the execution is a virtual function, the method address storage table is a virtual function table, and the method address storage table pointer is a virtual function table pointer.

17. A compiling device for converting a source program described in an object-oriented language into an object code comprising:
a processor to execute the following units;
an intermediate code generating unit for generating an intermediate code from the source program;
an analyzing-target information extracting unit for extracting a method address storage table information, a class information and a function reference information from the intermediate code, wherein the method address storage table information includes at least a method address storage table, a method address storage table pointer for pointing to the method address storage table and a method index number corresponding to the method address storage table, the class information includes at least a base class name, a derived class name, a name of a new method determined in execution and an overridden method, and the function reference information is an information showing whether or not each method is referenced in the program;
a method address storage table optimizing unit for optimizing the intermediate code by executing a process of analyzing the extracted analyzing-target information and deleting the method address storage table of each class when it is detected from the analysis that none of the methods determined in the execution is overridden in one of the classes by the other class, a process of generating the method address storage table commonly usable in the both classes and a process of renewing the method address storage table pointer of the both classes to a leading address value of the generated method address storage table commonly usable in the both classes;
wherein the method address storage table information, the class information and the function reference information are extracted within a limited analyzing range when an analyzing-range limiting information including at least one of a file name, a function name and a class name is supplied to a compiler for executing the present compiling method in the analyzing-target information extracting unit; and
an object code converting unit for converting the optimized intermediate code into the object code.

18. A compiling device as claimed in claim 17, wherein
when any method determined in the execution that is defined but not referenced yet is present, a process of deleting all of the methods determined in the execution that are defined but not referenced yet from the class information and the method address storage table and a process of renewing the index number of the method determined in the execution in the method address storage table after the implementation of the deleting process are executed in the analyzing-target information extracting unit.

19. A compiling device as claimed in claim 17, wherein a process of deleting the method address storage table of a base class and a process of renewing the method address storage table pointer of the base class to a leading address value of the method address storage table of the a derived class overriding none of the methods determined in the execution in the base classes are executed when there is at least one derived class overriding none of the methods determined in the execution in the base classes so that the intermediate code is optimized in the method address storage table optimizing unit.

20. A compiling device as claimed in claim 17, wherein when at least two derived classes override none of the methods determined in the execution in the base classes and at least one of a pair of derived classes selected from the at least two derived classes does not newly define the method determined in the execution, a process of deleting the method address storage table of the derived class in which the method determined in the execution is not newly defined and a process of renewing the method address storage table pointer of the derived class from which the method address storage table is deleted to a leading address value of the method address storage table of the other derived class overriding none of the methods determined in the execution in the base classes are executed so that the intermediate code is optimized in the method address storage table optimizing unit.

21. A compiling device as claimed in claim 17, wherein when at least the two derived classes override none of the methods determined in the execution in the base classes, a pair of derived classes selected from the at least two derived classes both newly define the method determined in the execution, and at least one of the pair of derived classes further has a derived class, a process of newly generating the method address storage table by adding an address of the method determined in the execution newly defined in the one of the pair of derived classes to the method address storage table of the other of the pair of derived classes not further having the derived class and eliminating the former method address storage table, a process of renewing the method address storage table pointer of the pair of derived classes to a leading address value of the method address storage table newly generated, and a process of renewing the index value of the method determined in the execution in the method address storage table newly generated are executed so that the intermediate code is optimized in the method address storage table optimizing unit.

22. A compiling device as claimed in claim 17, wherein when the method address storage tables of the respective classes are compared and a method address value stored in one of the method address storage tables is included in a leading position of the other method address storage table, a process of deleting the method address storage table whose method address value is included in the other, and a process of renewing the method address storage table pointer of the class pointing to the method address storage table whose address value is included in the other to a leading address value of the method address storage table that includes the method address value are executed so that the intermediate code is optimized in the method address storage table optimizing unit.

23. A compiling device as claimed in claim 17, wherein when an instruction for displaying details of the executed optimization is supplied to a compiler, the class referencing the method address storage table to be optimized, the method address storage table prior to the optimization and the optimized method address storage table are outputted at least to a standard output in the method address storage table optimizing unit.

24. A compiling device as claimed in claim 17, wherein the object-oriented language is the C++ language, the method determined in the execution is a virtual function, the method address storage table is a virtual function table, and the method address storage table pointer is a virtual function table pointer.

25. A computer-readable compiling recording medium on which the respective steps of the compiling method as claimed in claim 1 are recorded as a program.

* * * * *

UNITED STATES PATENT AND TRADEMARK OFFICE
CERTIFICATE OF CORRECTION

| | |
|---|---|
| PATENT NO. | : 7,624,390 B2 |
| APPLICATION NO. | : 11/289678 |
| DATED | : November 24, 2009 |
| INVENTOR(S) | : Shinobu Asao |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-sixth Day of October, 2010

David J. Kappos
*Director of the United States Patent and Trademark Office*